(12) United States Patent
Mazzarese et al.

(10) Patent No.: US 8,494,088 B2
(45) Date of Patent: Jul. 23, 2013

(54) TRANSMITTING/RECEIVING APPARATUS AND METHOD THEREOF IN CODEBOOK BASED MULTIPLE ANTENNA SYSTEM

(75) Inventors: David Mazzarese, Suwon-si (KR); Bruno Clerckx, Seoul (KR); Sang-Woo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 558 days.

(21) Appl. No.: 12/768,061

(22) Filed: Apr. 27, 2010

(65) Prior Publication Data

US 2010/0272206 A1  Oct. 28, 2010

(30) Foreign Application Priority Data

Apr. 27, 2009 (KR) .................. 10-2009-0036638
Apr. 27, 2010 (KR) .................. 10-2010-0039047

(51) Int. Cl.
*H04B 7/04* (2006.01)

(52) U.S. Cl.
USPC .......................................... 375/299; 455/101

(58) Field of Classification Search
USPC ............... 375/130, 140, 141, 146, 147, 259, 375/260, 267, 219, 295, 296, 299, 316, 347, 375/358, 377; 455/91, 101, 132; 370/208, 370/210, 335, 342, 441
See application file for complete search history.

(56) References Cited

U.S. PATENT DOCUMENTS

| | | | | |
|---|---|---|---|---|
| 8,325,852 B2 * | 12/2012 | Zhang et al. | ........... | 375/299 |
| 2006/0029157 A1 * | 2/2006 | Dabak et al. | ........... | 375/299 |
| 2007/0191066 A1 * | 8/2007 | Khojastepour et al. | ..... | 455/562.1 |
| 2007/0223423 A1 * | 9/2007 | Kim et al. | ........... | 370/334 |
| 2008/0165836 A1 * | 7/2008 | Landau et al. | ........... | 375/221 |
| 2008/0186212 A1 | 8/2008 | Clerckx et al. | | |
| 2008/0317145 A1 | 12/2008 | Clerckx et al. | | |
| 2009/0017769 A1 * | 1/2009 | Chen et al. | ........... | 455/69 |
| 2009/0201825 A1 * | 8/2009 | Shen et al. | ........... | 370/252 |
| 2009/0245410 A1 * | 10/2009 | Lee et al. | ........... | 375/267 |
| 2010/0061482 A1 * | 3/2010 | Lee et al. | ........... | 375/296 |
| 2011/0122971 A1 * | 5/2011 | Kim et al. | ........... | 375/316 |

FOREIGN PATENT DOCUMENTS

| | | |
|---|---|---|
| KR | 10-2008-0042434 A | 5/2008 |
| WO | 2007/066936 A2 | 6/2007 |
| WO | 2008/147855 A1 | 12/2008 |

OTHER PUBLICATIONS

Xiaolong Zhu et al., "Rank-1 precoder for uplink open-loop SU-MIMO," IEEE 802.16 Broadband Wireless Access Working Group, Jan. 5, 2009, 1-4.*
Wookbong Lee et al., "Performance comparison of IEEE 802.16m OL-SU-MIMO", IEEE 802.16 Broadband Wireless Access Working Group, IEEE C802.16m-09/0019, Jan. 5, 2009, pp. 1-28.
Yong Sun, "Proposed Text of MIMO for the IEEE 802-16m Amendment", IEEE 802.16 Broadband Wireless Access Working Group, IEEE C802.16m-09/0513rl, Mar. 11, 2009, pp. 1-36.
"WirelessMAN-Advanced Air Interface for Broadband Wireless Access Systems", IEEE Standards Activities Department, IEEE P802.16.1/D4, Feb. 2012, pp. i-xlvii, 1-1036.

* cited by examiner

*Primary Examiner* — Tesfaldet Bocure
(74) *Attorney, Agent, or Firm* — Jefferson IP Law, LLP

(57) ABSTRACT

A transmission/reception apparatus and a method thereof in a codebook-based multiple antenna system is provided. In a transmission method in a codebook-based Multiple Input Multiple Output (MIMO) system, feedback information is received from a receiver. A downlink Open-Loop Single User MIMO (OL SU-MIMO) codebook subset is determined within a base cookbook based on the feedback information. At least one data stream is transmitted via at least one antenna using the determined downlink OL SU-MIMO codebook subset.

70 Claims, 5 Drawing Sheets

TRANSMITTING/RECEIVING APPARATUS AND METHOD THEREOF IN CODEBOOK BASED MULTIPLE ANTENNA SYSTEM

PRIORITY

This application claims the benefit under 35 U.S.C. §119(a) of a Korean patent application filed in the Korean Intellectual Property Office on Apr. 27, 2009 and assigned Serial No. 10-2009-0036638, and a Korean patent application filed in the Korean Intellectual Property Office on Apr. 27, 2010 and assigned Serial No. 10-2010-0039047, the entire disclosures of both of which are hereby incorporated by reference.

BACKGROUND OF THE INVENTION

1. Field of the Invention

The present invention relates to a transmitting/receiving apparatus and a method thereof. More particularly, the present invention relates to a transmitting/receiving apparatus and a method for performing communication using a codebook.

2. Description of the Related Art

Recently, as the demand for high speed and high quality data transmission increases, a Multiple Input Multiple Output (MIMO) technique, which uses a plurality of transmission/reception antennas, is drawing attention as a technique for meeting this demand. The MIMO technique may improve a channel capacity as compared to a single antenna system by performing communication using a plurality of channels via a plurality of antennas. For example, when both the transmission and reception ends use M transmission antennas and reception antennas, a channel of each antenna is independent, and a bandwidth and entire transmission power are fixed, an average channel capacity increases by M multiples compared to a single antenna.

The MIMO technique may be classified into Open-Loop MIMO (OL-MIMO) and Closed-Loop MIMO (CL-MIMO) depending on whether channel information is fed back. In the CL-MIMO, a receiver feeds back channel information to a transmitter. The CL-MIMO may be further classified into two kinds. One kind of CL-MIMO allows a receiver to quantize a channel coefficient value and feeds back the coefficient value to a transmitter. In this method, although the transmitter may recognize a more accurate value regarding a channel, a feedback overhead occurs. The other kind of CL-MIMO allows a receiver to search for a codebook using an estimated channel, and feeds back a codebook index corresponding to a searched weight to a transmitter. In this method, the feedback overhead may be reduced.

In a time-varying channel environment caused by movement of a terminal, it is difficult to perform downlink transmission based on feedback information. In this case, an OL-MIMO based downlink transmission may be relied on. In addition, to maintain acceptable performance in this case, it is required to adapt to the number of spatial streams transmitted by a user. The number of spatial streams or a spatial multiplexing gain depends on not only a Signal-to-Noise Ratio (SNR) typically experienced by a terminal receiver, but also on spatial correlation in a channel. The number of transmitted streams is typically adjusted by applying a precoding matrix at a transmitter. The precoding matrix has a size of N×M, where M is the number of physical antennas and N is the number of spatial streams.

A precoding matrix from a codebook used for CL-MIMO transmission is reused for OL-MIMO transmission. However, since a terminal does not feedback particular information regarding a channel matrix in the OL-MIMO, a method for actually selecting a precoding matrix from a codebook is unclear.

Accordingly, there is a need for an apparatus and a method for codebook design in an environment where a codebook used in the CL-MIMO system is reused in the OL-MIMO system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for generating a codebook for Open-Loop-Multiple Input Multiple Output (OL-MIMO) from a codebook for Closed-Loop-MIMO (CL-MIMO) in a codebook-based MIMO system.

Another aspect of the present invention is to provide an apparatus and a method for performing communication using a codebook for OL-MIMO from a codebook for CL-MIMO in a codebook-based MIMO system.

In accordance with an aspect of the present invention, a transmission method in a codebook-based MIMO system is provided. The method includes receiving feedback information from a receiver, determining a downlink Open-Loop Single User MIMO (OL SU-MIMO) codebook subset within a base cookbook based on the feedback information, and transmitting at least one data stream via at least one antenna using the determined downlink OL SU-MIMO codebook subset.

In accordance with another aspect of the present invention, a reception method in a codebook-based MIMO system is provided. The method includes transmitting feedback information to a transmitter, and wherein the feedback information is used for determining a downlink Open-Loop Single User MIMO (OL SU-MIMO) codebook subset within a base codebook, receiving at least one data stream from the transmitter via at least one antenna using the determined downlink OL SU-MIMO codebook subset.

In accordance with still another aspect of the present invention, a transmitting apparatus in a codebook-based MIMO system is provided. The apparatus includes a feedback receiver for receiving feedback information from a receiver, a codebook subset determining unit for determining a downlink Open-Loop Single User MIMO (OL SU-MIMO) codebook subset within a base cookbook based on the feedback information, and a precoding unit for transmitting at least one data stream via at least one antenna using the determined downlink OL SU-MIMO codebook subset.

In accordance with further another aspect of the present invention, a receiving apparatus in a codebook-based MIMO system is provided. The apparatus includes a feedback transmitter for transmitting feedback information to a transmitter, and wherein the feedback information is used for determining a downlink Open-Loop Single User MIMO (OL SU-MIMO) codebook subset within a base codebook, an MIMO detector for receiving at least one data stream from the transmitter via at least one antenna using the determined downlink OL SU-MIMO codebook subset.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, like reference numerals will be understood to refer to like parts, components, and structures.

DETAILED DESCRIPTION OF EXEMPLARY EMBODIMENTS

Figure 1:
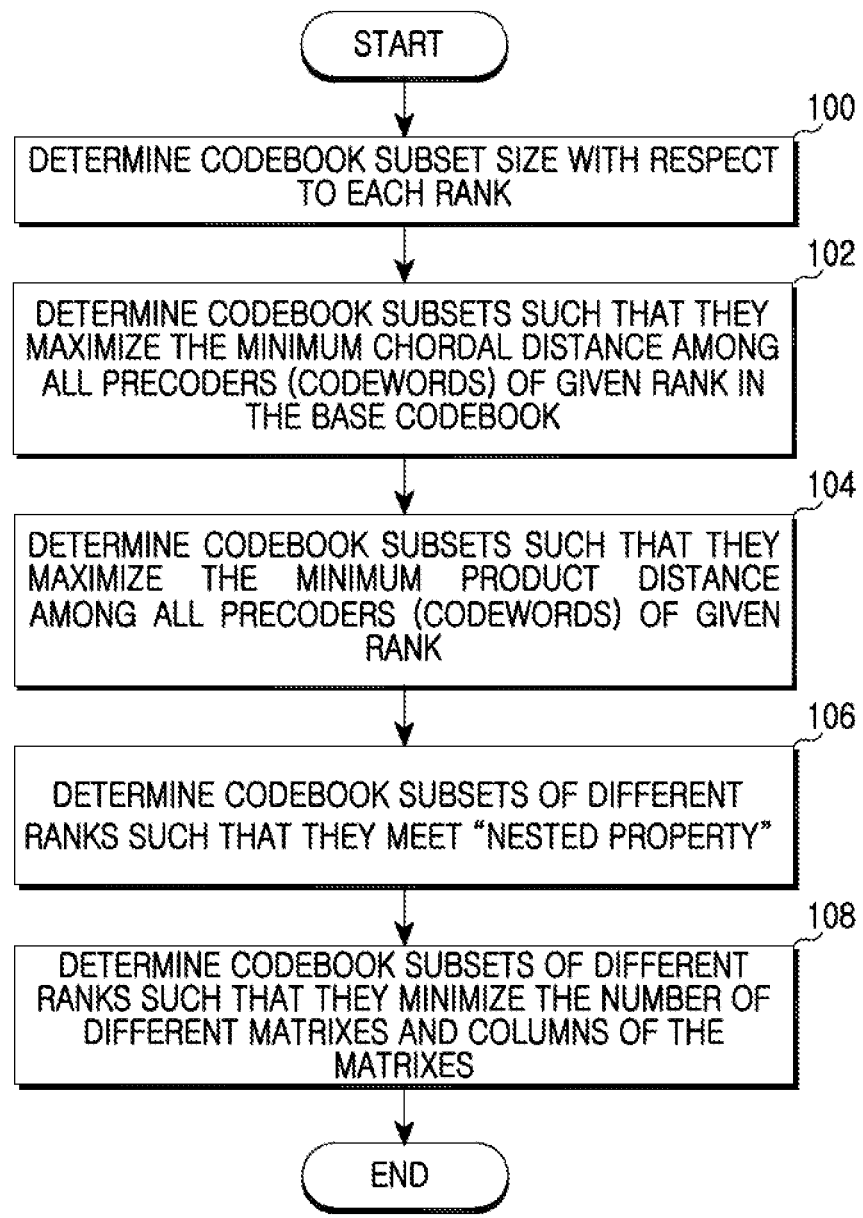
FIG. 1 is a flowchart illustrating a method for generating a codebook according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an alternative for designing an Open Loop-Multiple Input Multiple Output (OL-MIMO) codebook by reusing a Closed Loop-MIMO (CL-MIMO) codebook in a codebook-based MIMO system. In addition, exemplary embodiments of the present invention provide a system (transmitter and receiver) for performing communication using an OL-MIMO codebook designed by reusing a CL-MIMO codebook.

Though the present invention is described as applied to a system using an Orthogonal Frequency Division Multiple (OFDM)/Orthogonal Frequency Division Multiple Access (OFDMA) wireless communication system as an example, the present invention is applicable to any system using a codebook-based access (for example, a Code Division Multiple Access (CDMA) based system).

In addition, exemplary methods for designing a codebook for eight, four, and two antennas are described below. However, the present invention is readily extended according to any number of transmission antennas, any number of streams, any number of codebook index bits, and the like.

A design of a codebook subset used for precoding in OL-MIMO is different from a design of a codebook subset used for precoding in CL-MIMO. A base codebook used for CL-MIMO precoding has a purpose of minimizing a quantization error between actual channels and quantized channels thereof through a subband including contiguous subcarriers in a matrix of a codebook.

During OL-MIMO precoding, however, the codebook subset needs to be optimized for allocation of resources including contiguous or distributed subcarriers. In an exemplary implementation, two purposes should be met simultaneously. The two purposes include providing spatial diversity in distributed resource allocation and providing an opportunistic scheduling gain in localized allocation. Furthermore, the codebook subset needs to be robust against a variety of channel propagation conditions, including spatially uncorrelated and correlated channels.

Constraints such as a characteristic (referred to as 'nested property') that ensures that a precoder of a lower rank is contained as ordered or unordered columns of a precoder of a higher rank on the same set of subcarriers may be added in order to reduce the complexity of system operation. This property allows more flexibility in the resource allocation, as users with different ranks can reuse the same precoded pilots. It also simplifies the rank adaptation at the terminal, since the computation of a Channel Quality Indicator (CQI) for higher ranks can be reused for the computation of the CQI for the lower ranks.

Exemplary embodiments of the present invention are described using the following notations:

N: the number of matrices in the base codebook of a given rank $N_t$: the number of transmit antennas $N_w$: the size of a codebook subset of a given rank $w_k$: codeword (matrix) with index k in the base codebook of a given rank $\theta_r$: an angle having a value within $[0, 2\pi]$ $w^T$: the transpose of a matrix w $w^H$: the Hermitian (transpose conjugate) of a matrix w λ: a wavelength d: spacing of antenna array elements (in wavelengths)

A base codebook employed by the Institute of Electrical and Electronics Engineers (IEEE) 802.16 standard is used in the following description.

Hereinafter, the base codebook denotes a codebook for CL-MIMO, and an exemplary method for generating the base codebook as a codebook for OL-MIMO is described with reference to FIG. 1.

FIG. 1 is a flowchart illustrating a method for generating a codebook according to an exemplary embodiment of the present invention.

Referring to FIG. 1, a processor chooses a codebook subset size for each rank in order to ensure full spatial diversity over distributed resource allocation in step 100. Typically, the processor chooses $N_w$ such that the number of unique columns among all matrixes is at least equal to $N_t$.

In step 102, the processor chooses codebook subsets such that they maximize the minimum chordal distance among all precoders of a given rank in the base codebook, in order to optimize the performance in spatially uncorrelated channels. The minimum chordal distance is determined using Equation (1).

$$OLcodebook\_candidates = \underset{1 \leq k < l \leq N}{argmax} \min \sqrt{1 - |w_k^H w_l|^2} \quad (1)$$

In step 104, the processor chooses the codebook subsets for a rank-1 such that they maximize the minimum product distance among all precoders of a given rank, in order to optimize the performance in spatially correlated channels. The minimum product distance is determined using Equation (2).

$$OLcodebook = \underset{OLcodebook\_candidates}{argmax} \min_{\theta_t} \prod_{k=1}^{N} |w_k^T a_t(\theta_t)|^2 \quad (2)$$

$$a_t(\theta_t) = \begin{bmatrix} 1 & e^{-j2\pi \frac{d}{\lambda} \cos(\theta_t)} & \dots & e^{-j2\pi(n_t-1)\frac{d}{\lambda}\cos(\theta_t)} \end{bmatrix}^T$$

In step 106, the processor chooses codebook subsets of different ranks such that they meet a nested property that ensures that a precoder of a lower rank is contained as ordered or unordered columns of a precoder of a higher rank. Therefore, users of different ranks are allocated different subcarriers in a resource that shares the same precoded pilots. These pilots, among all users who are allocated the subcarriers in the resource, are precoded together with a precoder of a highest rank.

The processor chooses codebook subsets of different ranks such that they minimize the number of different matrices and columns of the matrices in step 108.

Meanwhile, the $N_t \times M_t$ precoding matrix $w_k$ applied on subcarrier k is selected as the codeword of index i in an OL-MIMO codebook subset of rank $M_t$, where i is given by Equation (3), $$i = \mod(\lceil k/(N \cdot P_{SC}) \rceil - 1, N_w) + 1 \quad (3)$$

where $P_{SC}$ is the number of contiguous subcarriers, N is an adaptive parameter which determines the number of subcarriers in a resource over which the precoder is constant, $\lceil x \rceil$ is a function for outputting an integer value close to x, k is a subcarrier index, and $N_w$ is a codebook subset size of a given rank. That is, in Equation (3), the OL-MIMO codebook subset is applied for each subband.

Exemplary OL-MIMO codebook subsets generated from CL-MIMO codebooks by the codebook generating method of FIG. 1 are shown in Tables 1 to 12.

In the case of eight transmission antennas, a cycling period $(N \cdot P_{SC})$ and a subset size $N_w$ are set as in Table 1.

TABLE 1

| Rank | $N_w$ | $N \cdot P_{SC}$ |
|---|---|---|
| 1 | 8 | 4 |
| 2 | 4 | 4 |
| 3 | 4 | 4 |
| 4 | 2 | 4 |
| 5 | 2 | 4 |
| 6 | 2 | 4 |
| 7 | 2 | 4 |
| 8 | 1 | 4 |

In Table 1, $N \cdot P_{SC}$ may have a value different from 4, but is the same over all ranks. Simultaneously, an index of a codeword in a subset is defined as in Table 2.

TABLE 2

| Rank 1 | | | Rank 2 | | | Rank 3 | | |
|---|---|---|---|---|---|---|---|---|
| Codeword matrix (index of columns of V8 (:,:,3)) | Index in base codebook | Index in subset | Codeword matrix (index of columns of V8 (:,:,1)) | Index in base codebook | Index in subset | Codeword matrix (index of columns of V8 (:,:,1)) | Index in base codebook | Index in subset |
| 1 | 0 | 0 | {1,5} | 0 | 0 | {1,3,5} | 0 | 0 |
| 4 | 3 | 1 | {2,6} | 1 | 1 | {2,4,6} | 1 | 1 |
| 6 | 5 | 2 | {3,7} | 2 | 2 | {2,3,7} | 2 | 2 |
| 8 | 7 | 3 | {4,8} | 3 | 3 | {4,6,8} | 5 | 3 |
| 10 | 9 | 4 | | | | | | |
| 12 | 11 | 5 | | | | | | |
| 14 | 13 | 6 | | | | | | |
| 16 | 15 | 7 | | | | | | |

In the IEEE 802.16 standard, V8(:,:,1) and V8(:,:,3) are defined by Equation (4) below.

$$V8(:,:,1) = \frac{1}{\sqrt{8}} H_{1,1,3}(1,3,2,4) = \tag{4}$$

$$\frac{1}{\sqrt{8}}\begin{bmatrix} 1 & 1 & 1 & 1 & 1 & 1 & 1 & 1 \\ 1 & -1 & j & -j & \frac{(1+j)}{\sqrt{2}} & -\frac{(1+j)}{\sqrt{2}} & \frac{(-1+j)}{\sqrt{2}} & -\frac{(-1+j)}{\sqrt{2}} \\ 1 & 1 & -1 & -1 & j & j & -j & -j \\ 1 & -1 & -j & j & \frac{(-1+j)}{\sqrt{2}} & -\frac{(-1+j)}{\sqrt{2}} & \frac{(1+j)}{\sqrt{2}} & -\frac{(1+j)}{\sqrt{2}} \\ 1 & 1 & 1 & 1 & -1 & -1 & -1 & -1 \\ 1 & -1 & j & -j & -\frac{(1+j)}{\sqrt{2}} & \frac{(1+j)}{\sqrt{2}} & -\frac{(-1+j)}{\sqrt{2}} & \frac{(-1+j)}{\sqrt{2}} \\ 1 & 1 & -1 & -1 & -j & -j & j & j \\ 1 & -1 & -j & j & -\frac{(-1+j)}{\sqrt{2}} & \frac{(-1+j)}{\sqrt{2}} & -\frac{(1+j)}{\sqrt{2}} & \frac{(1+j)}{\sqrt{2}} \end{bmatrix}$$

$$V_8(:,j,3) = \frac{1}{\sqrt{8}}\begin{bmatrix} 1 \\ e^{j\pi\sin(\theta_j)} \\ e^{j2\pi\sin(\theta_j)} \\ e^{j3\pi\sin(\theta_j)} \\ e^{j4\pi\sin(\theta_j)} \\ e^{j5\pi\sin(\theta_j)} \\ e^{j6\pi\sin(\theta_j)} \\ e^{j7\pi\sin(\theta_j)} \end{bmatrix}$$

where $\theta_j = ((j-1) + 1/2) * \frac{\pi}{24} - \frac{\pi}{3}$

During a rank 4 to a rank 8, an index of a codeword in a subset is the same as an index of the same codeword in a base codebook.

For example, when $N_w=8$ and a rank is 1, there is a codeword of $_{16}C_8=12870$ set. Here, two sets maximize a minimum chordal distance, and the minimum product distance of both sets is 0. The two sets are {0,3,5,7,9,11,13,15} and {0,2,4,6, 8,10,12,15}. However, since a maximum spatial diversity degree may be obtained from distributed resource allocation, a subset of a small size is searched for. An advantage of a small subset size in eight transmission antennas is that it can minimize the memory and process requirements. That is, in a rank 1, an index of a base codebook is {0,3,5,7,9,11,13,15}, and a column index of V8(:,:,3) corresponding thereto is {1,4,6,8,10,12,14,16}. In addition, in a rank 2, when {0,1,2, 3} is determined as an index of a base codebook by reducing a subset size, a column index of V8(:,:,1) becomes {1,5}, {2,6}, {3,7}, and {4,8}. In a rank 3, when {0,1,2,5} is determined as an index of a base codebook by reducing a subset size, a column index of V8(:,:,1) becomes {1,3,5}, {2,4,6}, {2,3,7}, and {4,6,8}.

Meanwhile, when an order of codewords is viewed in a frequency domain, it is known that the nested property is met through every subcarrier during precoders of a rank 2 to a rank 8. That is, an upper rank includes a lower rank.

A first row represents a precoder index in a codebook subset, and a second row represents a precoder using a column of a rank 1 in a base codebook.

Table 3 illustrates an example of a cycling sequence with nested property in eight transmission antenna codebook subsets.

TABLE 3

| Subcarrier index | Rank 2 precoder | Rank 3 precoder | Rank 4 precoder | Rank 5 precoder | Rank 6 precoder | Rank 7 precoder | Rank 8 precoder |
|---|---|---|---|---|---|---|---|
| 0 to $N.P_{SC} - 1$ | 0 {15} | 0 {135} | 0 {1537} | 0 {12357} | 0 {123567} | 0 {1234567} | 0 {12345678} |
| $N.P_{SC}$ to $2N.P_{SC} - 1$ | 1 {26} | 1 {246} | 1 {2648} | 1 {12468} | 1 {124568} | 1 {1234568} | 0 {12345678} |
| $2N.P_{SC}$ to | 2 | 2 | 0 | 0 | 0 | 0 | 01 |

TABLE 3-continued

| Subcarrier index | Rank 2 precoder | Rank 3 precoder | Rank 4 precoder | Rank 5 precoder | Rank 6 precoder | Rank 7 precoder | Rank 8 precoder |
|---|---|---|---|---|---|---|---|
| $3 \cdot N \cdot P_{SC} - 1$ | {37} | {237} | {1537} | {12357} | {123567} | {1234567} | {12345678} |
| $3 \cdot N \cdot P_{SC}$ to $4 \cdot N \cdot P_{SC} - 1$ | {48} | {468} | {2648} | {12468} | {124568} | {1234568} | {12345678} |

That is, from a subcarrier 0 to a subcarrier $N \cdot P_{SC} - 1$, a column index of V8(:,:,1) in a rank 2 is {1,5} (i.e., corresponds to a codebook matrix index 0 of a rank 2), a column index of V8(:,:,1) in a rank 3 is {1,3,5} (i.e., corresponds to a codebook matrix index 1 of a rank 3), . . . , and a column index of V8(:,:,1) in a rank 8 is {1,2,3,4,5,6,7,8} (i.e., corresponds to a codebook matrix index 1 of a rank 8). Likewise, with respect to a subcarrier $N \cdot P_{SC}$ to a subcarrier $2N \cdot P_{SC} - 1$, a subcarrier $2N \cdot P_{SC}$ to a subcarrier $3N \cdot P_{SC} - 1$, a subcarrier $3N \cdot P_{SC}$ to a subcarrier $4N \cdot P_{SC} - 1$, etc., a 'nested property' is met.

Referring to Table 3, for a rank 1, a codeword corresponding to a codebook matrix index 0 of a rank 2 is allocated to subcarriers 0 to $N \cdot P_{SC} - 1$, a codeword corresponding to a codebook matrix index 1 of a rank 2 is allocated to subcarriers $N \cdot P_{SC}$ to $2N \cdot P_{SC} - 1$, a codeword corresponding to a codebook matrix index 2 of a rank 2 is allocated to subcarriers $2N \cdot P_{SC}$ to $3N \cdot P_{SC} - 1$, and a codeword corresponding to a codebook matrix index 3 of a rank 2 is allocated to subcarriers $3N \cdot P_{SC}$ to $4N \cdot P_{SC} - 1$. In other words, when a rank is determined and a subcarrier is determined, a relevant codeword among OL-MIMO codebook subsets is determined.

Therefore, Tables 2 and 3 may be expressed again by Tables 4 and 5.

Here, $C_{DLOLSU}(N_t, M_t, N_w)$ is a DownLink (DL) OL Single User-MIMO (SU-MIMO) index, $N_t$ is the number of transmission antennas, $M_t$ is the number of streams, and $N_w$ is a codebook subset size of a given rank. $C_{DLOLSU}(N_t, M_t, N_w, i)$ is an i-th codebook entry of $C_{DLOLSU}(N_t, M_t, N_w)$.

First, in the case of four transmission antennas, a cycling period ($N \cdot P_{SC}$) and a subset size $N_w$ are set as in Table 6.

TABLE 6

| Rank | $N_w$ | $N \cdot P_{SC}$ |
|---|---|---|
| 1 | 4 | 4 |
| 2 | 4 | 4 |
| 3 | 2 | 4 |
| 4 | 1 | 4 |

In Table 6, $N \cdot P_{SC}$ may have a value different from 4, but is the same over all ranks. Simultaneously, an index of a codeword in a subset is defined as in Table 7.

TABLE 4

| $C_{DLOLSU}(8,1,8,n)$ | | $C_{DLOLSU}(8,2,4,n)$ | | $C_{DLOLSU}(8,3,4,n)$ | | $C_{DLOLSU}(8,4,2,n)$ | |
|---|---|---|---|---|---|---|---|
| n | C(8,1,4,m) in base codebook | n | C(8,2,4,m) in base codebook | n | C(8,3,4,m) in base codebook | n | C(8,4,4,m) in base codebook |
| 0 | C(8,1,4,0) | 0 | C(8,2,4,0) | 0 | C(8,3,4,0) | 0 | C(8,4,4,0) |
| 1 | C(8,1,4,3) | 1 | C(8,2,4,1) | 1 | C(8,3,4,1) | 1 | C(8,4,4,1) |
| 2 | C(8,1,4,5) | 2 | C(8,2,4,2) | 2 | C(8,3,4,2) | | |
| 3 | C(8,1,4,7) | 3 | C(8,2,4,3) | 3 | C(8,3,4,5) | | |
| 4 | C(8,1,4,9) | | | | | | |
| 5 | C(8,1,4,11) | | | | | | |
| 6 | C(8,1,4,13) | | | | | | |
| 7 | C(8,1,4,15) | | | | | | |

TABLE 5

| $C_{DLOLSU}(8,5,2,n)$ | | $C_{DLOLSU}(8,6,2,n)$ | | $C_{DLOLSU}(8,7,2,n)$ | | $C_{DLOLSU}(8,8,1,n)$ | |
|---|---|---|---|---|---|---|---|
| n | C(8,5,4,m) in base codebook | n | C(8,6,4,m) in base codebook | n | C(8,7,4,m) in base codebook | n | C(8,8,4,m) in base codebook |
| 0 | C(8,5,4,0) | 0 | C(8,6,4,0) | 0 | C(8,7,4,0) | 0 | C(8,8,4,0) |
| 1 | C(8,5,4,1) | 1 | C(8,6,4,1) | 1 | C(8,7,4,1) | | |

TABLE 7

| Rank 1 | | | Rank 2 | | | Rank 3 | | | Rank 4 | | |
|---|---|---|---|---|---|---|---|---|---|---|---|
| Index in base codebook | Index in subset | Codeword matrix (columns as index of rank 1 in base codebook) | Index in base codebook | Index in subset | Codeword matrix (columns as index of rank 1 in base codebook) | Index in base codebook | Index in subset | Codeword matrix (columns as index of rank 1 in base codebook) | Index in base codebook | Index in subset | Codeword matrix (columns as index of rank 1 in base codebook) |
| 8 | 0 | {8} | 23 | 0 | {8,9} | 12 | 0 | {8,9,10} | 4 | 0 | {8,9,10,11} |
| 10 | 1 | {10} | 29 | 1 | {10,11} | 13 | 1 | {8,10,11} | | | |
| 9 | 2 | {9} | 27 | 2 | {9,10} | | | | | | |
| 11 | 3 | {11} | 25 | 3 | {8,11} | | | | | | |

For example, when $N_w=4$ and a rank is 1, there is a codeword of $_{64}C_4=635376$ set. Here, eight sets maximize a minimum chordal distance, and only 1 set of eight sets maximizes a minimum product distance. This set is {8,9,10,11}.

A rank 1 codeword 8 is included in a rank 2 codeword index {14,23,25,26}, a rank 1 codeword 9 is included in a rank 2 codeword index {23,27,28,43}, a rank 1 codeword 10 is included in a rank 2 codeword index {14,27,29,30,44,57}, and a rank 1 codeword 11 is included in a rank 2 codeword index {25,29,51,59}. Therefore, when $N_w=4$ in a rank 2, codeword matrixes of {8,9}, {10,11}, {9,10}, and {8,11} exist.

Likewise, when a rank is 3 and $N_w=2$, codeword matrixes are {8,9,10} and {8,10,11}. Similarly, rank 1 codeword 8 is nested in rank 3 codewords with index: {12,13} rank 1 codeword 9 is nested in rank 3 codewords with index: {12} rank 1 codeword 10 is nested in rank 3 codewords with index: {12,13} rank 1 codeword 11 is nested in rank 3 codewords with index: {12}

Likewise, when a rank is 4 and $N_w=1$, a codeword matrix is {8,9,10,11}.

Meanwhile, when an order of codewords is viewed from a frequency domain, it is known that the nested property is met through every subcarrier during precoders of a rank 1 to a rank 4. That is, an upper rank includes a lower rank.

A first row represents a precoder index in a codebook subset, and a second row represents a precoder using a column of a rank 1 in a base codebook.

Table 8 illustrates an example of a cycling sequence with nested property in four transmission codebook subsets.

TABLE 8

| Subcarrier index | Rank 1 precoder | Rank 2 precoder | Rank 3 precoder | Rank 4 precoder |
|---|---|---|---|---|
| 0 to $N \cdot P_{SC} - 1$ | 0 | 0 | 0 | 0 |
| | {8} | {8,9} | {8,9,10} | {8,9,10,11} |
| $N \cdot P_{SC}$ to $2N \cdot P_{SC} - 1$ | 1 | 1 | 1 | 0 |
| | {10} | {10,11} | {8,10,11} | {8,9,10,11} |
| $2N \cdot P_{SC}$ to $3N \cdot P_{SC} - 1$ | 2 | 2 | 0 | 0 |
| | {9} | {9,10} | {8,9,10} | {8,9,10,11} |
| $3N \cdot P_{SC}$ to $4N \cdot P_{SC} - 1$ | 3 | 3 | 1 | 0 |
| | {11} | {8,11} | {8,10,11} | {8,9,10,11} |

Likewise, even in the case of four transmission antennas, when a rank is determined and a subcarrier is determined, a relevant codeword of OL-MIMO codebook subsets is determined. Therefore, a terminal or a base station may determine a codeword in an OL-MIMO codebook without separate feedback information.

Therefore, Table 8 may be expressed again by Table 9.

TABLE 9

| $C_{DLOLSU}(4,1,4,n)$ | $C_{DLOLSU}(4,2,4,n)$ | $C_{DLOLSU}(4,3,2,n)$ | $C_{DLOLSU}(4,4,1,n)$ |
|---|---|---|---|
| C(4,1,6,m) in n base codebook | C(4,2,6,m) in n base codebook | C(4,3,6,m) in n base codebook | C(4,4,6,m) in n base codebook |
| 0  C(4,1,6,8) | 0  C(4,2,6,23) | 0  C(4,3,6,12) | 0  C(4,4,6,4) |
| 1  C(4,1,6,10) | 1  C(4,2,6,29) | 1  C(4,3,6,13) | |
| 2  C(4,1,6,9) | 2  C(4,2,6,27) | | |
| 3  C(4,1,6,11) | 3  C(4,2,6,25) | | |

Here, $C_{DLOLSU}(N_t,M_t,N_w)$ is a DL OL SU-MIMO index, $N_t$ is the number of transmission antennas, $M_t$ is the number of streams, and $N_w$ is a codebook subset size of a given rank. $C_{DLOLSU}(N_t,M_t,N_w,i)$ is an i-th codebook entry of $C_{DLOLSU}(N_t,M_t,N_w)$.

For another example, in the case of four transmission antennas, a cycling period ($N \cdot P_{SC}$) and a subset size $N_w$ are set as in Table 10.

TABLE 10

| Rank | $N_w$ | $N \cdot P_{SC}$ |
|---|---|---|
| 1 | 4 | 4 |
| 2 | 2 | 4 |
| 3 | 2 | 4 |
| 4 | 1 | 4 |

In Table 10, $N \cdot P_{SC}$ may have a value different from 4, but is the same over all ranks. Simultaneously, an index of a codeword in a subset is defined as in Table 11.

TABLE 11

| | Rank 1 | | | Rank 2 | | | Rank 3 | | | Rank 4 | |
|---|---|---|---|---|---|---|---|---|---|---|---|
| Index in base codebook | Index in subset | Codeword matrix (columns as index of rank 1 in base codebook) | Index in base codebook | Index in subset | Codeword matrix (columns as index of rank 1 in base codebook) | Index in base codebook | Index in subset | Codeword matrix (columns as index of rank 1 in base codebook) | Index in base codebook | Index in subset | Codeword matrix (columns as index of rank 1 in base codebook) |
| 8 | 0 | {8} | 23 | 0 | {8, 9} | 12 | 0 | {8, 9, 10} | 4 | 0 | {8, 9, 10, 11} |
| 10 | 1 | {10} | 29 | 1 | {10, 11} | 13 | 1 | {8, 10, 11} | | | |
| 9 | 2 | {9} | | | | | | | | | |
| 11 | 3 | {11} | | | | | | | | | |

For example, when $N_w=4$ and a rank is 1, there is a codeword of $_{64}C_4=635376$ set. Here, eight sets maximize a minimum chordal distance, and only 1 set of eight sets maximizes a minimum product distance. This set is {8,9,10,11}. This is similar to Table 5, but a different point is that when $N_w=2$ in a rank 2, codeword matrixes of {8,9} and {10,11} exist.

Meanwhile, when an order of codewords is viewed from a frequency domain, it is known that the nested property is met through every subcarrier during precoders of a rank 1 to a rank 4. That is, an upper rank includes a lower rank.

A first row represents a precoder index in a codebook subset, and a second row represents a precoder using a column of a rank 1 in a base codebook.

Table 12 illustrates an example of a cycling sequence with nested property in four transmission antenna codebook subsets.

TABLE 12

| Subcarrier index | Rank 1 precoder | Rank 2 precoder | Rank 3 precoder | Rank 4 precoder |
|---|---|---|---|---|
| 0 to $N \cdot P_{SC} - 1$ | 0<br>{8} | 0<br>{8,9} | 0<br>{8,9,10} | 0<br>{8,9,10,11} |
| $N \cdot P_{SC}$ to $2N \cdot P_{SC} - 1$ | 1<br>{10} | 1<br>{10,11} | 1<br>{8,10,11} | 0<br>{8,9,10,11} |
| $2N \cdot P_{SC}$ to $3N \cdot P_{SC} - 1$ | 2<br>{9} | 0<br>{8,9} | 0<br>{8,9,10} | 0<br>{8,9,10,11} |
| $3N \cdot P_{SC}$ to $4N \cdot P_{SC} - 1$ | 3<br>{11} | 1<br>{10,11} | 1<br>{8,10,11} | 0<br>{8,9,10,11} |

Table 12 may be expressed again by Table 13.

TABLE 13

| n | $C_{DLOLSU}$ (4, 1, 4, n) | n | $C_{DLOLSU}$ (4, 2, 2, n) | n | $C_{DLOLSU}$ (4, 3, 2, n) | n | $C_{DLOLSU}$ (4, 4, 1, n) |
|---|---|---|---|---|---|---|---|
| | C (4, 1, 6, m) in base codebook | | C (4, 2, 6, m) in base codebook | | C (4, 3, 6, m) in base codebook | | C (4, 4, 6, m) in base codebook |
| 0 | C (4, 1, 6, 8) | 0 | C (4, 2, 6, 23) | 0 | C (4, 3, 4, 12) | 0 | C (4, 4, 3, 4) |
| 1 | C (4, 1, 6, 10) | 1 | C (4, 2, 6, 29) | 1 | C (4, 3, 4, 13) | | |
| 2 | C (4, 1, 6, 9) | | | | | | |
| 3 | C (4, 1, 6, 11) | | | | | | |

Here, $C_{DLOLSU}(N_t,M_t,N_w)$ is a DL OL SU-MIMO index, $N_t$ is the number of transmission antennas, $M_t$ is the number of streams, and $N_w$ is a codebook subset size of a given rank. $C_{DLOLSU}(N_t,M_t,N_w,i)$ is an i-th codebook entry of $C_{DLOLSU}(N_t,M_t,N_w)$.

In the case of two transmission antennas, a cycling period ($N \cdot P_{SC}$) and a subset size $N_w$ are set as in Table 14.

TABLE 14

| Rank | $N_w$ | $N \cdot P_{SC}$ |
|---|---|---|
| 1 | 4 | 4 |
| 2 | 2 | 4 |

In Table 14, $N \cdot P_{SC}$ may have a value different from 4, but is the same over all ranks. Simultaneously, an index of a codeword in a subset is defined as in Table 15.

TABLE 15

| Rank 1 | | | Rank 2 | | |
|---|---|---|---|---|---|
| Index in base codebook | Index in subset | Codeword matrix (columns as index of rank 1 in base codebook) | Index in base codebook | Index in subset | Codeword matrix (columns as index of rank 1 in base codebook) |
| 0 | 0 | {0} | 0 | 0 | {0, 4} |
| 2 | 1 | {2} | 2 | 1 | {2, 8} |
| 4 | 2 | {4} | | | |
| 6 | 3 | {6} | | | |

Meanwhile, when an order of codewords is viewed from a frequency domain, it is known that the nested property is met through every subcarrier during precoders of a rank 1 to a rank 2. That is, an upper rank includes a lower rank.

A first row represents a precoder index in a codebook subset, and a second row represents a precoder using a column of a rank 1 in a base codebook.

Table 16 illustrates an example of a cycling sequence with nested property in two transmission antenna codebook subsets.

TABLE 16

| Subcarrier index | Rank 1 precoder | Rank 2 precoder |
|---|---|---|
| 0 to N.$P_{SC}$ − 1 | 0 {0} | 0 {0,4} |
| N.$P_{SC}$ to 2N.$P_{SC}$ − 1 | 1 {2} | 1 {2,6} |
| 2N.$P_{SC}$ to 3N.$P_{SC}$ − 1 | 2 {4} | 0 {0,4} |
| 3N.$P_{SC}$ to 4N.$P_{SC}$ − 1 | 3 {6} | 1 {2,6} |

Table 16 may be expressed again by Table 17.

Here, $C_{DLOLSU}(N_t,M_t,N_w)$ is a DL OL SU-MIMO index, $N_t$ is the number of transmission antennas, $M_t$ is the number of streams, and $N_w$ is a codebook subset size of a given rank. $C_{DLOLSU}(N_t,M_t,N_w,i)$ is an i-th codebook entry of $C_{DLOLSU}(N_t,M_t,N_w)$.

In another realization, in the case where N is reduced even more in Table 15, for two transmission antennas, a cycling period (N·$P_{SC}$) and a subset size $N_w$ are set as in Table 18.

TABLE 18

| Rank | $N_w$ | N.$P_{SC}$ |
|---|---|---|
| 1 | 2 | 4 |
| 2 | 1 | 4 |

In Table 18, N·$P_{SC}$ may have a value different from 4, but is the same over all ranks. Simultaneously, an index of a codeword in a subset is defined as in Table 19.

TABLE 19

| Rank 1 | | | Rank 2 | | |
|---|---|---|---|---|---|
| Index in base codebook | Index in subset | Codeword matrix (columns as index of rank 1 in base codebook) | Index in base codebook | Index in subset | Codeword matrix (columns as index of rank 1 in base codebook) |
| 2 | 0 | {2} | 2 | 0 | {2, 6} |
| 6 | 1 | {6} | | | |

TABLE 17

| $C_{DLOLSU}(2,1,4,n)$ | | $C_{DLOLSU}(2,2,2,n)$ | |
|---|---|---|---|
| n | C(2,1,4,m) in base codebook | n | C(2,2,4,m) in base codebook |
| 0 | C(2,1,4,0) | 0 | C(2,2,4,0) |
| 1 | C(2,1,4,2) | 1 | C(2,2,4,2) |
| 2 | C(2,1,4,4) | | |
| 3 | C(2,1,4,6) | | |

Table 20 illustrates an example of a cycling sequence with nested property in two transmission antenna codebook subsets.

TABLE 20

| Subcarrier index | Rank 1 precoder | Rank 2 precoder |
|---|---|---|
| 0 to N.$P_{SC}$ − 1 | 0 {2} | 0 {2,6} |
| N.$P_{SC}$ to 2N.$P_{SC}$ − 1 | 1 {6} | 0 {2,6} |
| 2N.$P_{SC}$ to 3N.$P_{SC}$ − 1 | 0 {2} | 0 {2,6} |

TABLE 20-continued

| Subcarrier index | Rank 1 precoder | Rank 2 precoder |
| --- | --- | --- |
| $3N \cdot P_{SC}$ to $4N \cdot P_{SC} - 1$ | 1<br>{6} | 0<br>{2,6} |

Table 20 may be expressed again by Table 21.

TABLE 21

| $C_{DLOLSU}(2,1,2,n)$ | | $C_{DLOLSU}(2,2,1,n)$ | |
| --- | --- | --- | --- |
| | $C(2,1,3,m)$ | | |
| n | in base codebook | n | $C(2,2,3,m)$ in base codebook |
| 0 | $C(2,1,3,2)$ | 0 | $C(2,2,3,2)$ |
| 1 | $C(2,1,3,6)$ | | |

Here, $C_{DLOLSU}(N_t, M_t, N_w)$ is a DL OL SU-MIMO index, $N_t$ is the number of transmission antennas, $M_t$ is the number of streams, and $N_w$ is a codebook subset size of a given rank. $C_{DLOLSU}(N_t, M_t, N_w, i)$ is an i-th codebook entry of $C_{DLOLSU}(N_t, M_t, N_w)$.

In another realization, in the case where N is reduced even more in Table 15, for two transmission antennas, a cycling period ($N \cdot P_{SC}$) and a subset size $N_w$ are set as in Table 22.

TABLE 22

| Rank | $N_w$ | $N \cdot P_{SC}$ |
| --- | --- | --- |
| 1 | 2 | 4 |
| 2 | 1 | 4 |

In Table 22, $N \cdot P_{SC}$ may have a value different from 4, but is the same over all ranks. Simultaneously, an index of a codeword in a subset is defined as in Table 23.

TABLE 23

| | Rank 1 | | | Rank 2 | |
| --- | --- | --- | --- | --- | --- |
| Index in base codebook | Index in subset | Codeword matrix (columns as index of rank 1 in base codebook) | Index in base codebook | Index in subset | Codeword matrix (columns as index of rank 1 in base codebook) |
| 0 | 0 | {0} | 0 | 0 | {0, 4} |
| 4 | 1 | {4} | | | |

Table 24 illustrates an example of a cycling sequence with nested property in two transmission antenna codebook subsets.

TABLE 24

| Subcarrier index | Rank 1 precoder | Rank 2 precoder |
| --- | --- | --- |
| 0 to $N \cdot P_{SC} - 1$ | 0<br>{0} | 0<br>{0,4} |
| $N \cdot P_{SC}$ to $2N \cdot P_{SC} - 1$ | 1<br>{4} | 0<br>{0,4} |
| $2N \cdot P_{SC}$ to $3N \cdot P_{SC} - 1$ | 0<br>{0} | 0<br>{0,4} |
| $3N \cdot P_{SC}$ to $4N \cdot P_{SC} - 1$ | 1<br>{4} | 0<br>{0,4} |

Table 24 may be expressed again by Table 25.

TABLE 25

| $C_{DLOLSU}(2,1,2,n)$ | | $C_{DLOLSU}(2,2,1,n)$ | |
| --- | --- | --- | --- |
| | $C(2,1,3,m)$ | | |
| n | in base codebook | n | $C(2,1,3,m)$ in base codebook |
| 0 | $C(2,1,3,0)$ | 0 | $C(2,2,3,0)$ |
| 1 | $C(2,1,3,4)$ | | |

Here, $C_{DLOLSU}(N_t, M_t, N_w)$ is a DL OL SU-MIMO index, $N_t$ is the number of transmission antennas, $M_t$ is the number of streams, and $N_w$ is a codebook subset size of a given rank. $C_{DLOLSU}(N_t, M_t, N_w, i)$ is an i-th codebook entry of $C_{DLOLSU}(N_t, M_t, N_w)$.

In another realization, for four transmission antennas, a cycling period ($N \cdot P_{SC}$) and a subset size $N_w$ are set as in Table 26.

TABLE 26

| Rank | $N_w$ | $N \cdot P_{SC}$ |
| --- | --- | --- |
| 1 | 4 | 4 |
| 2 | 4 | 4 |
| 3 | 4 | 4 |
| 4 | 4 | 4 |

In Table 26, $N \cdot P_{SC}$ may have a value different from 4, but is the same over all ranks. Simultaneously, an index of a codeword in a subset is defined as in Table 27.

TABLE 27

| | | Rank 1 | Rank 2 | | Rank 3 | | Rank 4 | |
|---|---|---|---|---|---|---|---|---|
| Index in base codebook | Index in subset | Codeword matrix (columns as index of rank 1 in base codebook) | Index in base codebook | Index in subset | Index in base codebook | Index in subset | Index in base codebook | Index in subset |
| 9 | 0 | {9} | 9 | 0 | 9 | 0 | 9 | 0 |
| 15 | 1 | {15} | 15 | 1 | 15 | 1 | 15 | 1 |
| 49 | 2 | {49} | 49 | 2 | 49 | 2 | 49 | 2 |
| 55 | 3 | {55} | 55 | 3 | 55 | 3 | 55 | 3 |

TABLE 28

| Subcarrier index | Rank 1 precoder | Rank 2 precoder | Rank 3 precoder | Rank 4 precoder |
|---|---|---|---|---|
| 0 to $N \cdot P_{SC} - 1$ | 0 {9} | 0 {9} | 0 {9} | 0 {9} |
| $N \cdot P_{SC}$ to $2N \cdot P_{SC} - 1$ | 1 {15} | 1 {15} | 1 {15} | 1 {15} |
| $2N \cdot P_{SC}$ to $3N \cdot P_{SC} - 1$ | 2 {49} | 2 {49} | 2 {49} | 2 {49} |
| $3N \cdot P_{SC}$ to $4N \cdot P_{SC} - 1$ | 3 {55} | 3 {55} | 3 {55} | 3 {55} |

Table 28 may be expressed again by Table 29.

TABLE 29

| $C_{ULOLSU}(4, 1, 4, n)$ | | $C_{ULOLSU}(4, 2, 4, n)$ | | $C_{ULOLSU}(4, 3, 2, n)$ | | $C_{ULOLSU}(4, 4, 1, n)$ | |
|---|---|---|---|---|---|---|---|
| n | PMI m in UL base codebook of rank 1 | n | PMI m in UL base codebook of rank 2 | n | PMI m in UL base codebook of rank 3 | n | PMI m in UL base codebook of rank 3 |
| 0 | 9 | 0 | 9 | 0 | 9 | 0 | 9 |
| 1 | 15 | 1 | 15 | 1 | 15 | 1 | 15 |
| 2 | 49 | 2 | 49 | 2 | 49 | 2 | 49 |
| 3 | 55 | 3 | 55 | 3 | 55 | 3 | 55 |

An exemplary system that uses a generated codebook as described above is discussed below with reference to FIG. 2.

Figure 2:
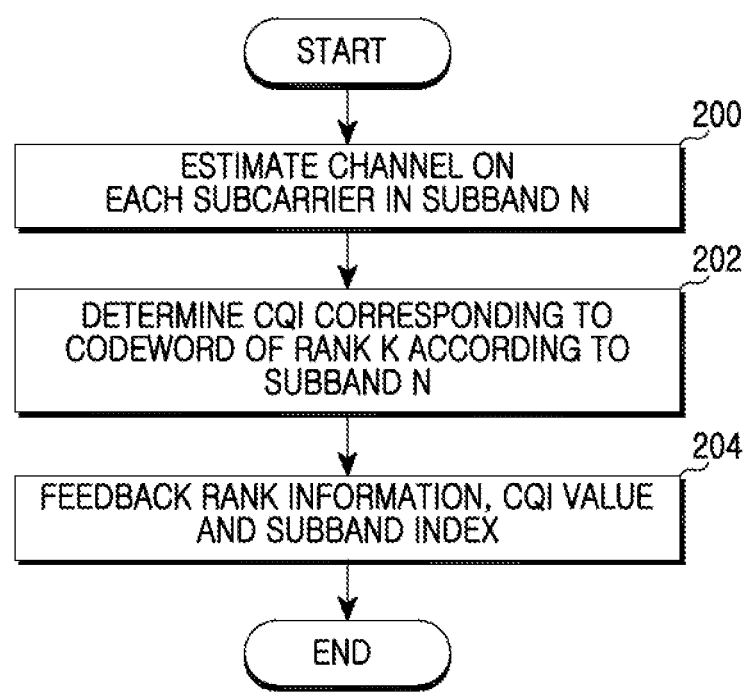
FIG. 2 is a flowchart illustrating an operation of a receiver in a codebook-based MIMO system according to an exemplary embodiment of the present invention.

FIG. 2 is a flowchart illustrating an operation of a receiver in a codebook-based MIMO system according to an exemplary embodiment of the present invention. In the following description, the term receiver is used as a relative conceptual element. Here, for sake of description, the receiver is assumed to be a terminal.

Referring to FIG. 2, the receiver estimates a channel coefficient using a reference signal (for example: a pilot signal) with respect to a subcarrier in a subband n, and forms a channel matrix between a transmission end and a reception end using the estimated channel coefficient in step 200.

In step 202, the receiver searches for a codebook using the channel matrix. In an exemplary implementation, the receiver determines a rank k that maximizes CQI with respect to the subband n from a codebook determined in Tables 1 to 12, and determines weight for each antenna.

In step 204, the receiver generates a feedback message using rank information, CQI, and subband index information, and feeds back the feedback message.

Figure 3:
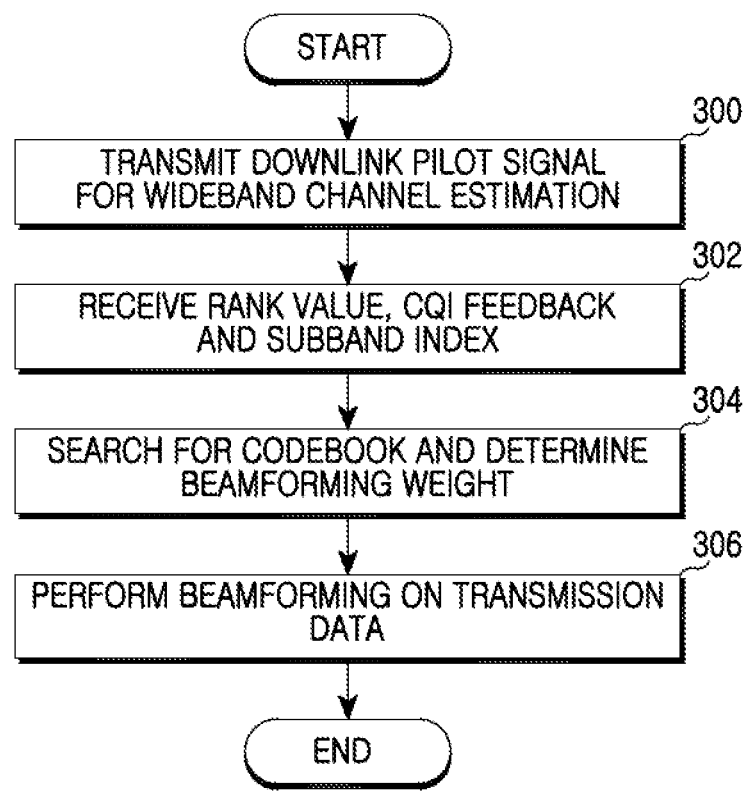
FIG. 3 is a flowchart illustrating an operation of a transmitter in a codebook-based MIMO system according to an exemplary embodiment of the present invention.

FIG. 3 is a flowchart illustrating an operation of a transmitter in a codebook-based MIMO system according to an exemplary embodiment of the present invention. In the following description, the term transmitter is used as a relative conceptual element. Here, for sake of description, the transmitter is assumed to be a base station.

Referring to FIG. 3, the transmitter transmits a reference signal (for example, a DL pilot signal) for wideband channel estimation to a receiver in step 300, and receives rank information, CQI, and subband index information in step 302.

When the rank information, the CQI information, and the subband index information are received, the transmitter searches for a codebook using the rank information, the CQI information, and the subband index information, and determines a beamforming weight (weight vector or weight matrix) corresponding to the codebook index in step 304.

In an exemplary implementation, when using an OL-MIMO codebook, the transmitter determines weight using rank information and subband index information. For example, when a rank is 2 and subcarriers between 0 to $NP_{SC}-1$ are used in Table 3, a precoding matrix is {1,5}.

In contrast, when using a CL-MIMO codebook, the transmitter determines rank information and CQI information in Table 2 and determines a precoding matrix.

The transmitter performs beamforming on transmission data using the determined beamforming weight and transmits the data via a plurality of antennas in step 306.

Figure 4:
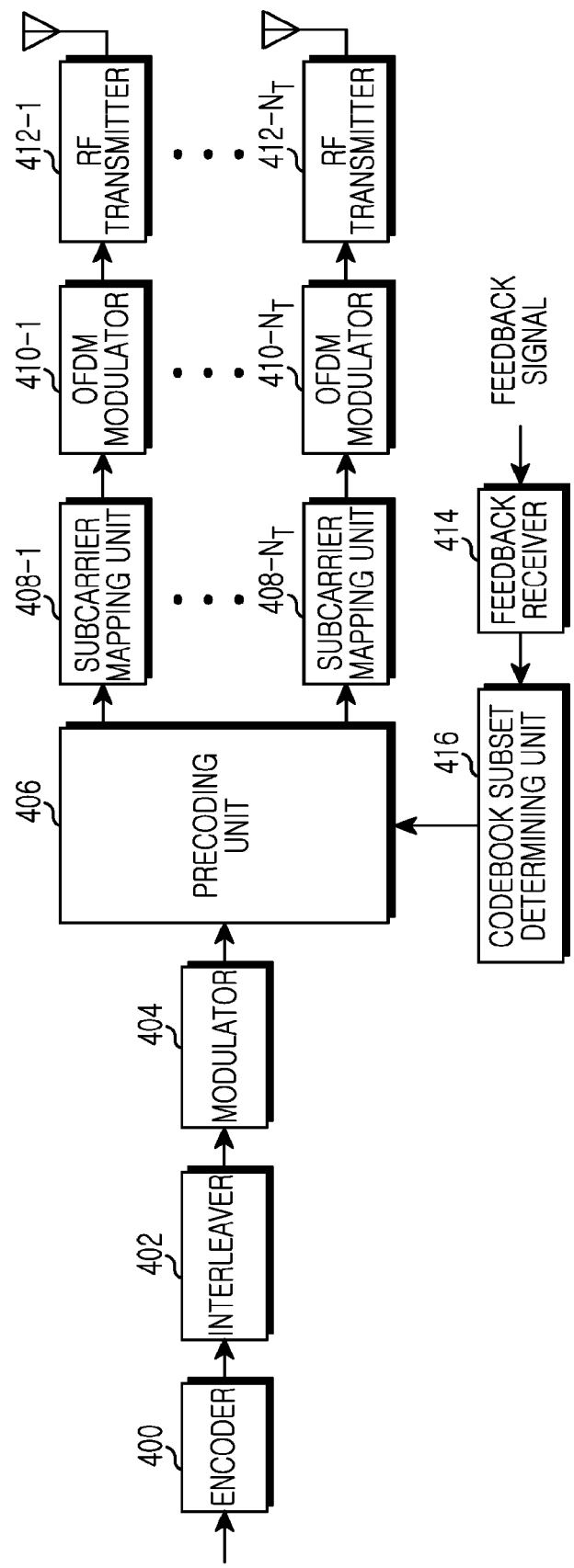
FIG. 4 is a block diagram illustrating a transmitter in a codebook-based MIMO system according to an exemplary embodiment of the present invention.

FIG. 4 is a block diagram illustrating a transmitter in a codebook-based MIMO system according to an exemplary embodiment of the present invention.

Referring to FIG. 4, the transmitter includes an encoder 400, an interleaver 402, a modulator 404, a precoding unit 406, a plurality of subcarrier mapping units 408-1 to 408-$N_t$, a plurality of OFDM modulators 410-1 to 410-$N_t$, a plurality of Radio Frequency (RF) transmitters 412-1 to 412-$N_t$, a feedback receiver 414, and a codebook subset determining unit 416.

Referring to FIG. 4, the encoder 400 channel-encodes transmission data and outputs the same. Here, the encoder 400 may use Convolutional Code (CC), a Turbo Code (TC), a Convolutional Turbo Code (CTC), a Low Density Parity Check (LDPC) code, etc. The interleaver 402 interleaves encoded data from the encoder 400, and outputs the same. The modulator 404 modulates data from the interleaver 402 and generates modulated symbols. For example, the modulator 404 may use Quadrature Phase Shift Keying (QPSK), 16 Quandrature Amplitude Modulation (QAM), 64QAM, etc. Here, in the case where a plurality of streams are serviced, the plurality of streams may be modulated at the same Modulation and Coding Scheme (MCS) level or different MCS levels.

The feedback receiver 414 reads a message fed back by a receiver (terminal). According to an exemplary embodiment of the present invention, the feedback receiver 414 obtains a codebook index (rank information, CQI information, and subband index information) from the feedback message, and provides the codebook index to the codebook subset determining unit 416. The codebook subset determining unit 416 has a codebook according to an exemplary embodiment of the present invention, searches for the codebook (refer to Tables 1 to 12) using the codebook index (rank information, CQI information, and subband index information) fed back by the terminal, and provides beamforming weight (weight vector or weight matrix) corresponding to the codebook index to the precoding unit 406.

The beamforming unit 406 generates a plurality of antenna signals by multiplying data from the modulator 404 by the beamforming weight (weight vector or weight matrix) from the codebook subset determining unit 416. At this point, a first antenna signal is provided to a subcarrier mapping unit 408-1, and an $N_t$-th antenna signal is provided to a subcarrier mapping unit 408-$N_t$.

Each of the plurality of subcarrier mapping units 408-1 to 408-$N_t$ maps a relevant antenna signal from the precoding unit 406 to a subcarrier and outputs the same. Each of the plurality of OFDM modulators 410-1 to 410-$N_t$ generates data in a time domain by performing Inverse Fast Fourier Transform (IFFT) on data from a corresponding subcarrier mapping unit 408, and inserts a protection section (e.g., Cyclic Prefix) into the data in the time domain to generate an OFDM symbol. Each of the plurality of RF transmitters 412-1 to 412-$N_t$ converts data from a corresponding OFDM modulator into an analog signal, converts the analog signal into an RF signal, and transmits the RF signal via a relevant antenna.

Figure 5:
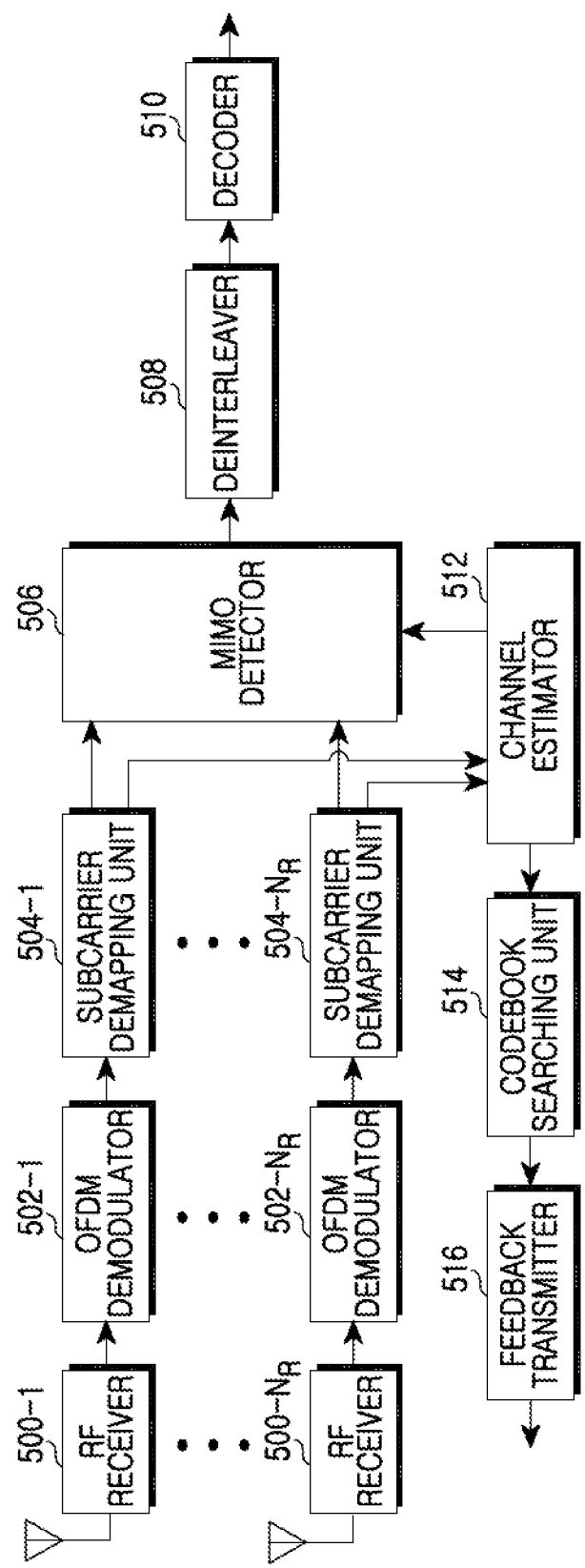
FIG. 5 is a block diagram illustrating a receiver in a codebook-based CL MIMO system according to an exemplary embodiment of the present invention.

FIG. 5 is a block diagram illustrating a receiver in a codebook-based CL MIMO system according to an exemplary embodiment of the present invention.

Referring to FIG. 5, the receiver includes a plurality of RF receivers 500-1 to 500-$N_r$, a plurality of OFDM demodulators 502-1 to 502-$N_r$, a plurality of subcarrier demapping units 504-1 to 504-$N_r$, an MIMO detector 506, a deinterleaver 508, a decoder 510, a channel estimator 512, a codebook searching unit 514, and a feedback transmitter 516.

Referring to FIG. 5, each of the plurality of RF receivers 500-1 to 500-Nr converts an RF signal received via a relevant antenna into a baseband signal, and converts the baseband analog signal into digital sample data. Each of the plurality of OFDM demodulators 502-1 to 502-$N_r$ removes a protection section from the sample data from the RF receiver, and generates data in a frequency domain by performing FFT on the sample data from which the protection section has been removed. Each of the plurality of subcarrier demapping units 504-1 to 504-$N_r$ extracts reception data from data from a corresponding OFDM demodulator, and provides the reception data to the MIMO detector 506. In addition, each of the plurality of subcarrier demapping units 504-1 to 504-$N_r$, extracts a specific signal (e.g., pilot signal) for channel estimation and provides the signal to the channel estimator 512.

The MIMO detector 506 generates a reception vector using data from the plurality of subcarrier demapping units 504-1 to 504-$N_r$, and estimates a transmission symbol using the reception vector and a channel matrix from the channel estimator 512. At this point, the MIMO detector 506 may use various known MIMO detection algorithms. Here, it is assumed that an output of the MIMO detector 506 is Log Likelihood Ratio (LLR) data. The deinterleaver 508 deinterleaves data from the MIMO detector 506. The decoder 510 decodes data from the deinterleaver 508 and recovers information data.

The channel estimator 512 estimates channel coefficients using pilot signals from the subcarrier demapping units 504-1 to 504-$N_r$, generates a channel matrix using the channel coefficients, and provides the channel matrix to the codebook searching unit 514. The codebook searching unit 514 has a codebook formed according to an exemplary embodiment of the present invention, searches for the codebook using the channel matrix from the channel estimator 512, and provides the searched codebook index (including rank information) to the feedback transmitter 516.

The feedback transmitter 516 generates a feedback message using the codebook index from the codebook searching unit 514, and transmits the feedback message to a base station.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A transmission method in a codebook-based Multiple Input Multiple Output (MIMO) system, the method comprising:
    receiving feedback information from a receiver;
    determining a downlink Open-Loop Single User MIMO (OL SU-MIMO) codebook subset within a base codebook, based on the feedback information; and
    transmitting at least one data stream via at least one antenna using the determined the downlink OL SU-MIMO codebook subset,
    wherein the downlink OL SU-MIMO codebook subset comprises at least one codeword, a number of codewords determined based on a rank, and a number of transmission antennas.

2. The method of claim 1, wherein the feedback information comprises at least one of a rank, a Channel Quality Indicator (CQI), and a subband index.

3. The method of claim 1, wherein the at least one antenna consists of eight antennas and the downlink OL SU-MIMO codebook comprises a relation between a rank and a codebook subset size $N_w$, corresponding to the rank in the following table:

|       | rank |   |   |   |   |   |   |   |
| ----- | ---- | - | - | - | - | - | - | - |
|       | 1    | 2 | 3 | 4 | 5 | 6 | 7 | 8 |
| $N_w$ | 8    | 4 | 4 | 2 | 2 | 2 | 2 | 1. |

4. The method of claim 3, wherein when the eight transmission antennas are used, the OL-MIMO codebook comprises the following table:

| $C_{DLOLSU}(8,1,8,n)$ | | $C_{DLOLSU}(8,2,4,n)$ | | $C_{DLOLSU}(8,3,4,n)$ | | $C_{DLOLSU}(8,4,2,n)$ | |
|---|---|---|---|---|---|---|---|
| | C(8,1,4,m) in base | | C(8,2,4,m) in base | | C(8,3,4,m) in base | | C(8,4,4,m) in base |
| n | codebook | n | codebook | n | codebook | n | codebook |
| 0 | C(8,1,4,0) | 0 | C(8,2,4,0) | 0 | C(8,3,4,0) | 0 | C(8,4,4,0) |
| 1 | C(8,1,4,3) | 1 | C(8,2,4,1) | 1 | C(8,3,4,1) | 1 | C(8,4,4,1) |
| 2 | C(8,1,4,5) | 2 | C(8,2,4,2) | | C(8,3,4,2) | | |
| 3 | C(8,1,4,7) | 3 | C(8,2,4,3) | | C(8,3,4,5) | | |
| 4 | C(8,1,4,9) | | | | | | |
| 5 | C(8,1,4,11) | | | | | | |
| 6 | C(8,1,4,13) | | | | | | |
| 7 | C(8,1,4,15) | | | | | | |

| $C_{DLOLSU}(8,5,2,n)$ | | $C_{DLOLSU}(8,6,2,n)$ | | $C_{DLOLSU}(8,7,2,n)$ | | $C_{DLOLSU}(8,8,1,n)$ | |
|---|---|---|---|---|---|---|---|
| | C(8,5,4,m) in base | | C(8,6,4,m) in base | | C(8,7,4,m) in base | | C(8,8,4,m) in base |
| n | codebook | n | codebook | n | codebook | n | codebook |
| 0 | C(8,5,4,0) | 0 | C(8,6,4,0) | 0 | C(8,7,4,0) | 0 | C(8,8,4,0) |
| 1 | C(8,5,4,1) | 1 | C(8,6,4,1) | 1 | C(8,7,4,1) | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

5. The method of claim 1, wherein the at least one antenna consists of four antennas and the downlink OL SU-MIMO codebook comprises a relation between a rank and a codebook subset size $N_w$ corresponding to the rank in the following table:

| | rank | | | |
|---|---|---|---|---|
| | 1 | 2 | 3 | 4 |
| $N_w$ | 4 | 4 | 2 | 1 |

6. The method of claim 5, wherein when the four transmission antennas are used, the downlink OL SU-MIMO codebook comprises the following table:

| $C_{DLOLSU}(4,1,4,n)$ | | $C_{DLOLSU}(4,2,4,n)$ | | $C_{DLOLSU}(4,3,2,n)$ | | $C_{DLOLSU}(4,4,1,n)$ | |
|---|---|---|---|---|---|---|---|
| | C(4,1,6,m) in base | | C(4,2,6,m) in base | | C(4,3,6,m) in base | | C(4,4,6,m) in base |
| n | codebook | n | codebook | n | codebook | n | codebook |
| 0 | C(4,1,6,8) | 0 | C(4,2,6,23) | 0 | C(4,3,6,12) | 0 | C(4,4,6,4) |
| 1 | C(4,1,6,10) | 1 | C(4,2,6,29) | 1 | C(4,3,6,13) | | |
| 2 | C(4,1,6,9) | 2 | C(4,2,6,27) | | | | |
| 3 | C(4,1,6,11) | 3 | C(4,2,6,25) | | | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

7. The method of claim 1, wherein the at least one antenna consists of two antennas and the downlink OL SU-MIMO codebook comprises a relation between a rank and a codebook subset size $N_w$ corresponding to the rank in the following table:

| | rank | |
|---|---|---|
| | 1 | 2 |
| $N_w$ | 2 | 1 |

8. The method of claim 7, wherein when the two transmission antennas are used, the downlink OL SU-MIMO codebook comprises the following table:

| | $C_{DLOLSU}(2,1,2,n)$ | | $C_{DLOLSU}(2,2,1,n)$ |
|---|---|---|---|
| n | C(2,1,3,m) in base codebook | n | C(2,2,3,m) in base codebook |
| 0 | C(2,1,3,2) | 0 | C(2,2,3,2) |
| 1 | C(2,1,3,6) | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

9. The method of claim 7, wherein when the two transmission antennas are used, the downlink OL SU-MIMO codebook comprises the following table:

| | $C_{DLOLSU}(2,1,2,n)$ | | $C_{DLOLSU}(2,2,1,n)$ |
|---|---|---|---|
| n | C(2,1,3,m) in base codebook | n | C(2,1,3,m) in base codebook |
| 0 | C(2,1,3,0) | 0 | C(2,2,3,0) |
| 1 | C(2,1,3,4) | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

10. The method of claim 1, wherein the at least one antenna consists of two antennas and the downlink OL SU-MIMO codebook comprises a relation between a rank and a codebook subset size $N_w$ corresponding to the rank in following table:

| | rank | |
|---|---|---|
| | 1 | 2 |
| $N_w$ | 4 | 2. |

11. The method of claim 10, wherein when the two transmission antennas are used, the downlink OL SU-MIMO codebook comprises the following table:

| | $C_{DLOLSU}(2,1,4,n)$ | | $C_{DLOLSU}(2,2,2,n)$ |
|---|---|---|---|
| n | C(2,1,4,m) in base codebook | n | C(2,2,4,m) in base codebook |
| 0 | C(2,1,4,0) | 0 | C(2,2,4,0) |
| 1 | C(2,1,4,2) | 1 | C(2,2,4,2) |
| 2 | C(2,1,4,4) | | |
| 3 | C(2,1,4,6) | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

12. The method of claim 1, wherein the at least one antenna consists of four antennas and the downlink OL SU-MIMO codebook comprises a relation between a rank and a codebook subset size $N_w$ corresponding to the rank in the following table:

| | rank | | | |
|---|---|---|---|---|
| | 1 | 2 | 3 | 4 |
| $N_w$ | 4 | 2 | 2 | 1. |

13. The method of claim 12, wherein when the four transmission antennas are used, the downlink OL SU-MIMO codebook comprises the following table:

| $C_{DLOLSU}$ (4, 1, 4, n) | | $C_{DLOLSU}$ (4, 2, 2, n) | | $C_{DLOLSU}$ (4, 3, 2, n) | | $C_{DLOLSU}$ (4, 4, 1, n) | |
|---|---|---|---|---|---|---|---|
| n | C (4, 1, 6, m) in base codebook | n | C (4, 2, 6, m) in base codebook | n | C (4, 3, 6, m) in base codebook | n | C (4, 4, 6, m) in base codebook |
| 0 | C (4, 1, 6, 8) | 0 | C (4, 2, 6, 23) | 0 | C (4, 3, 6, 12) | 0 | C (4, 4, 6, 4) |
| 1 | C (4, 1, 6, 10) | 1 | C (4, 2, 6, 29) | 1 | C (4, 3, 6, 13) | | |
| 2 | C (4, 1, 6, 9) | | | | | | |
| 3 | C (4, 1, 6, 11) | | | | | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

14. The method of claim 1, wherein the at least one antenna consists of four antennas and the downlink OL SU-MIMO codebook comprises a relation between a rank and a codebook subset size $N_w$ corresponding to the rank in the following table:

| | rank | | | |
|---|---|---|---|---|
| | 1 | 2 | 3 | 4 |
| $N_w$ | 4 | 4 | 4 | 4. |

15. The method of claim 14, wherein when the four transmission antennas are used, the downlink OL SU-MIMO codebook comprises the following table:

| $C_{ULOLSU}$ (4, 1, 4, n) | | $C_{ULOLSU}$ (4, 2, 4, n) | | $C_{ULOLSU}$ (4, 3, 2, n) | | $C_{ULOLSU}$ (4, 4, 1, n) | |
|---|---|---|---|---|---|---|---|
| n | PMI m in UL base codebook of rank 1 | n | PMI m in UL base codebook of rank 2 | n | PMI m in UL base codebook of rank 3 | n | PMI m in UL base codebook of rank 3 |
| 0 | 9 | 0 | 9 | 0 | 9 | 0 | 9 |
| 1 | 15 | 1 | 15 | 1 | 15 | 1 | 15 |
| 2 | 49 | 2 | 49 | 2 | 49 | 2 | 49 |
| 3 | 55 | 3 | 55 | 3 | 55 | 3 | 55. |

16. The method of claim 1, wherein the downlink OL SU-MIMO codebook has a nested property where a precoder of a lower rank comprises one of ordered and unordered columns of a precoder of a higher rank.

17. The method of claim 1, further comprising generating the downlink OL SU-MIMO in the base codebook, wherein the generating of the downlink OL SU-MIMO codebook comprises:
   determining a codebook subset size for each rank;
   determining a codebook subset that maximizes a minimum chordal distance with respect to all codewords of a relevant rank in the base codebook;
   determining a codebook subset that maximizes a minimum product distance with respect to all the codewords of a corresponding rank in the base codebook; and
   determining a codebook subset such that the corresponding rank is contained in a different rank in the codebook subset that meets the minimum chordal distance and the minimum product distance.

18. The method of claim 17, wherein the minimum chordal distance is determined using the following equation:

$$\text{OLcodebook\_candidates} = \underset{1 \leq k < l \leq N}{\operatorname{argmax\,min}} \sqrt{1 - |w_k^H w_l|^2}.$$

19. The method of claim 17, wherein the minimum product distance is determined using the following equation:

$$OLcodebook = \underset{OLcodebook\_candidates}{\operatorname{argmax}} \min_{\theta_t} \prod_{k=1}^{N} |w_k^T a_t(\theta_t)|^2$$

$$a_t(\theta_t) = \begin{bmatrix} 1 & e^{-j2\pi\frac{d}{\lambda}\cos(\theta_t)} & \cdots & e^{-j2\pi(n_t-1)\frac{d}{\lambda}\cos(\theta_t)} \end{bmatrix}^T.$$

20. A reception method in a codebook-based Multiple Input Multiple Output (MIMO) system, the method comprising:
   transmitting feedback information to a transmitter; and
   wherein the feedback information is used for determining a downlink Open-Loop Single User MIMO (OL SU-MIMO) codebook subset within a base codebook,
   receiving at least one data stream from the transmitter via at least one antenna using the determined downlink OL SU-MIMO codebook subset,
   wherein the downlink OL SU-MIMO codebook subset comprises at least one codeword, a number of codewords determined based on a rank, and a number of transmission antennas.

21. The method of claim 20, wherein the feedback information comprises at least one of a rank, a Channel Quality Indicator (CQI), and a subband index.

22. The method of claim 20, wherein the at least one antenna consists of eight antennas and the downlink OL SU-MIMO codebook comprises a relation between a rank and a codebook subset size $N_w$ corresponding to the rank in the following table:

| | rank | | | | | | | |
|---|---|---|---|---|---|---|---|---|
| | 1 | 2 | 3 | 4 | 5 | 6 | 7 | 8 |
| $N_w$ | 8 | 4 | 4 | 2 | 2 | 2 | 2 | 1. |

23. The method of claim 22, wherein when the eight transmission antennas are used, the downlink OL SU-MIMO codebook comprises the following table:

| $C_{DLOLSU}(8,1,8,n)$ | | $C_{DLOLSU}(8,2,4,n)$ | | $C_{DLOLSU}(8,3,4,n)$ | | $C_{DLOLSU}(8,4,2,n)$ | |
|---|---|---|---|---|---|---|---|
| n | C(8,1,4,m) in base codebook | n | C(8,2,4,m) in base codebook | n | C(8,3,4,m) in base codebook | n | C(8,4,4,m) in base codebook |
| 0 | C(8,1,4,0) | 0 | C(8,2,4,0) | 0 | C(8,3,4,0) | 0 | C(8,4,4,0) |
| 1 | C(8,1,4,3) | 1 | C(8,2,4,1) | 1 | C(8,3,4,1) | 1 | C(8,4,4,1) |
| 2 | C(8,1,4,5) | 2 | C(8,2,4,2) | 2 | C(8,3,4,2) | | |
| 3 | C(8,1,4,7) | 3 | C(8,2,4,3) | 3 | C(8,3,4,5) | | |
| 4 | C(8,1,4,9) | | | | | | |
| 5 | C(8,1,4,11) | | | | | | |
| 6 | C(8,1,4,13) | | | | | | |
| 7 | C(8,1,4,15) | | | | | | |

-continued

| $C_{DLOLSU}(8,5,2,n)$ | | $C_{DLOLSU}(8,6,2,n)$ | | $C_{DLOLSU}(8,7,2,n)$ | | $C_{DLOLSU}(8,8,1,n)$ | |
|---|---|---|---|---|---|---|---|
| n | C(8,5,4,m) in base codebook | n | C(8,6,4,m) in base codebook | n | C(8,7,4,m) in base codebook | n | C(8,8,4,m) in base codebook |
| 0 | C(8,5,4,0) | 0 | C(8,6,4,0) | 0 | C(8,7,4,0) | 0 | C(8,8,4,0) |
| 1 | C(8,5,4,1) | 1 | C(8,6,4,1) | 1 | C(8,7,4,1) | | | where $C_{DLOLSU}(N_t, M_t, N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t, M_t, N_w, i)$ is an i-th codebook entry of $C_{DLOLSU}(N_t, M_t, N_w)$.

24. The method of claim 20, wherein the at least one antenna consists of four antennas and the downlink OL SU-MIMO codebook comprises a relation between a rank and a codebook subset size $N_w$ corresponding to the rank in the following table:

| | rank | | | |
|---|---|---|---|---|
| | 1 | 2 | 3 | 4 |
| $N_w$ | 4 | 4 | 2 | 1. |

25. The method of claim 24, wherein when the four transmission antennas are used, the downlink OL SU-MIMO codebook comprises the following table:

| $C_{DLOLSU}(4,1,4,n)$ | | $C_{DLOLSU}(4,2,4,n)$ | | $C_{DLOLSU}(4,3,2,n)$ | | $C_{DLOLSU}(4,4,1,n)$ | |
|---|---|---|---|---|---|---|---|
| n | C(4,1,6,m) in base codebook | n | C(4,2,6,m) in base codebook | n | C(4,3,6,m) in base codebook | n | C(4,4,6,m) in base codebook |
| 0 | C(4,1,6,8) | 0 | C(4,2,6,23) | 0 | C(4,3,6,12) | 0 | C(4,4,6,4) |
| 1 | C(4,1,6,10) | 1 | C(4,2,6,29) | 1 | C(4,3,6,13) | | |
| 2 | C(4,1,6,9) | 2 | C(4,2,6,27) | | | | |
| 3 | C(4,1,6,11) | 3 | C(4,2,6,25) | | | | | where $C_{DLOLSU}(N_t, M_t, N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t, M_t, N_w, i)$ is an i-th codebook entry of $C_{DLOLSU}(N_t, M_t, N_w)$.

26. The method of claim 20, wherein the at least one antenna consists of two antennas and the downlink OL SU-MIMO codebook comprises a relation between a rank and a codebook subset size $N_w$ corresponding to the rank in the following table:

| | rank | |
|---|---|---|
| | 1 | 2 |
| $N_w$ | 2 | 1. |

27. The method of claim 26, wherein when the two transmission antennas are used, the downlink OL SU-MIMO codebook comprises the following table:

| $C_{DLOLSU}(2,1,2,n)$ | | $C_{DLOLSU}(2,2,1,n)$ | |
|---|---|---|---|
| n | C(2,1,3,m) in base codebook | n | C(2,2,3,m) in base codebook |
| 0 | C(2,1,3,2) | 0 | C(2,2,3,2) |
| 1 | C(2,1,3,6) | | | where $C_{DLOLSU}(N_t, M_t, N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t, M_t, N_w, i)$ is an i-th codebook entry of $C_{DLOLSU}(N_t, M_t, N_w)$.

28. The method of claim 26, wherein when the two transmission antennas are used, the downlink OL SU-MIMO codebook comprises the following table below:

| $C_{DLOLSU}(2,1,2,n)$ | | $C_{DLOLSU}(2,2,1,n)$ | |
|---|---|---|---|
| n | C(2,1,3,m) in base codebook | n | C(2,1,3,m) in base codebook |
| 0 | C(2,1,3,0) | 0 | C(2,2,3,0) |
| 1 | C(2,1,3,4) | | | where $C_{DLOLSU}(N_t, M_t, N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t, M_t, N_w, i)$ is an i-th codebook entry of $C_{DLOLSU}(N_t, M_t, N_w)$.

29. The method of claim 20, wherein the at least one antenna consists of two antennas and the downlink OL SU-MIMO codebook comprises a relation between a rank and a codebook subset size $N_w$ corresponding to the rank in the following table:

|  | rank | |
|---|---|---|
|  | 1 | 2 |
| $N_w$ | 4 | 2. |

30. The method of claim 29, wherein when the two transmission antennas are used, the downlink OL SU-MIMO codebook comprises the following table:

| $C_{DLOLSU}(2,1,4,n)$ | | $C_{DLOLSU}(2,2,4,n)$ | |
|---|---|---|---|
| n | C(2,1,4,m) in base codebook | n | C(2,2,4,m) in base codebook |
| 0 | C(2,1,4,0) | 0 | C(2,2,4,0) |
| 1 | C(2,1,4,2) | 1 | C(2,2,4,2) |
| 2 | C(2,1,4,4) | | |
| 3 | C(2,1,4,6) | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

31. The method of claim 20, wherein the at least one antenna consists of four antennas and the downlink OL SU-MIMO codebook comprises a relation between a rank and a codebook subset size $N_w$ corresponding to the rank in the following table:

|  | rank | | | |
|---|---|---|---|---|
|  | 1 | 2 | 3 | 4 |
| $N_w$ | 4 | 2 | 2 | 1. |

32. The method of claim 31, wherein when the four transmission antennas are used, the downlink OL SU-MIMO codebook comprises the following table:

| $C_{DLOLSU}(4,1,4,n)$ | | $C_{DLOLSU}(4,2,2,n)$ | | $C_{DLOLSU}(4,3,2,n)$ | | $C_{DLOLSU}(4,4,1,n)$ | |
|---|---|---|---|---|---|---|---|
| n | C(4,1,6,m) in base codebook | n | C(4,2,6,m) in base codebook | n | C(4,3,6,m) in base codebook | n | C(4,4,6,m) in base codebook |
| 0 | C(4,1,6,8) | 0 | C(4,2,6,23) | 0 | C(4,3,6,12) | 0 | C(4,4,6,4) |
| 1 | C(4,1,6,10) | 1 | C(4,2,6,29) | 1 | C(4,3,6,13) | | |
| 2 | C(4,1,6,9) | | | | | | |
| 3 | C(4,1,6,11) | | | | | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

33. The method of claim 20, wherein the at least one antenna consists of four antennas and the downlink OL SU-MIMO codebook comprises a relation between a rank and a codebook subset size $N_w$ corresponding to the rank in the following table:

|  | rank | | | |
|---|---|---|---|---|
|  | 1 | 2 | 3 | 4 |
| $N_w$ | 4 | 4 | 4 | 4. |

34. The method of claim 33, wherein when the four transmission antennas are used, the downlink OL SU-MIMO codebook comprises the following table:

| $C_{ULOLSU}(4,1,4,n)$ | | $C_{ULOLSU}(4,2,4,n)$ | | $C_{ULOLSU}(4,3,2,n)$ | | $C_{ULOLSU}(4,4,1,n)$ | |
|---|---|---|---|---|---|---|---|
| n | PMI m in UL base codebook of rank 1 | n | PMI m in UL base codebook of rank 2 | n | PMI m in UL base codebook of rank 3 | n | PMI m in UL base codebook of rank 3 |
| 0 | 9 | 0 | 9 | 0 | 9 | 0 | 9 |
| 1 | 15 | 1 | 15 | 1 | 15 | 1 | 15 |
| 2 | 49 | 2 | 49 | 2 | 49 | 2 | 49 |
| 3 | 55 | 3 | 55 | 3 | 55 | 3 | 55. |

35. The method of claim 20, wherein the downlink OL SU-MIMO codebook has a nested property where a precoder of a lower rank comprises one of ordered and unordered columns of a precoder of a higher rank.

36. A transmitting apparatus in a codebook-based Multiple Input Multiple Output (MIMO) system, the apparatus comprising:
a feedback receiver for receiving feedback information from a receiver;
a codebook subset determining unit for determining a downlink Open-Loop Single User MIMO (OL SU-MIMO) codebook subset within in a base codebook based on the feedback information; and
a precoding unit for transmitting at least one data stream via at least one antenna using the determined downlink OL SU-MIMO codebook subset,
wherein the downlink OL SU-MIMO codebook subset comprises at least one codeword, a number of codewords determined based on a rank, and a number of transmission antennas.

37. The apparatus of claim 36, wherein the feedback information comprises at least one of a rank, a Channel Quality Indicator (CQI), and a subband index.

38. The apparatus of claim 36, wherein the at least one antenna consists of eight antennas and the downlink OL SU-MIMO codebook comprises a relation between a rank and a codebook subset size $N_w$ corresponding to the rank in the following table:

|       |   |   |   | rank |   |   |   |   |
|-------|---|---|---|------|---|---|---|---|
|       | 1 | 2 | 3 | 4    | 5 | 6 | 7 | 8 |
| $N_w$ | 8 | 4 | 4 | 2    | 2 | 2 | 2 | 1 |

39. The apparatus of claim 38, wherein when the eight transmission antennas are used, the downlink OL SU-MIMO codebook comprises the following table:

| $C_{DLOLSU}(8,1,8,n)$ | | $C_{DLOLSU}(8,2,4,n)$ | | $C_{DLOLSU}(8,3,4,n)$ | | $C_{DLOLSU}(8,4,2,n)$ | |
|---|---|---|---|---|---|---|---|
| n | C(8,1,4,m) in base codebook | n | C(8,2,4,m) in base codebook | n | C(8,3,4,m) in base codebook | n | C(8,4,4,m) in base codebook |
| 0 | C(8,1,4,0)  | 0 | C(8,2,4,0) | 0 | C(8,3,4,0) | 0 | C(8,4,4,0) |
| 1 | C(8,1,4,3)  | 1 | C(8,2,4,1) | 1 | C(8,3,4,1) | 1 | C(8,4,4,1) |
| 2 | C(8,1,4,5)  | 2 | C(8,2,4,2) | 2 | C(8,3,4,2) |   |            |
| 3 | C(8,1,4,7)  | 3 | C(8,2,4,3) | 3 | C(8,3,4,5) |   |            |
| 4 | C(8,1,4,9)  |   |            |   |            |   |            |
| 5 | C(8,1,4,11) |   |            |   |            |   |            |
| 6 | C(8,1,4,13) |   |            |   |            |   |            |
| 7 | C(8,1,4,15) |   |            |   |            |   |            |

| $C_{DLOLSU}(8,5,2,n)$ | | $C_{DLOLSU}(8,6,2,n)$ | | $C_{DLOLSU}(8,7,2,n)$ | | $C_{DLOLSU}(8,8,1,n)$ | |
|---|---|---|---|---|---|---|---|
| n | C(8,5,4,m) in base codebook | n | C(8,6,4,m) in base codebook | n | C(8,7,4,m) in base codebook | n | C(8,8,4,m) in base codebook |
| 0 | C(8,5,4,0) | 0 | C(8,6,4,0) | 0 | C(8,7,4,0) | 0 | C(8,8,4,0) |
| 1 | C(8,5,4,1) | 1 | C(8,6,4,1) | 1 | C(8,7,4,1) |   |            | where $C_{DLOLSU}(N_t, M_t, N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t, M_t, N_w, i)$ is an i-th codebook entry of $C_{DLOLSU}(N_t, M_t, N_w)$.

40. The apparatus of claim 36, wherein the at least one antenna consists of four antennas and the downlink OL SU-MIMO codebook comprises a relation between a rank and a codebook subset size $N_w$ corresponding to the rank as in the following table:

|       |   |   | rank |   |
|-------|---|---|------|---|
|       | 1 | 2 | 3    | 4 |
| $N_w$ | 4 | 4 | 2    | 1 |

41. The apparatus of claim 40, wherein when the four transmission antennas are used, the downlink OL SU-MIMO codebook comprises the following table:

| $C_{DLOLSU}(4,1,4,n)$ | | $C_{DLOLSU}(4,2,4,n)$ | | $C_{DLOLSU}(4,3,2,n)$ | | $C_{DLOLSU}(4,4,1,n)$ | |
|---|---|---|---|---|---|---|---|
| n | C(4,1,6,m) in base codebook | n | C(4,2,6,m) in base codebook | n | C(4,3,6,m) in base codebook | n | C(4,4,6,m) in base codebook |
| 0 | C(4,1,6,8)  | 0 | C(4,2,6,23) | 0 | C(4,3,6,12) | 0 | C(4,4,6,4) |
| 1 | C(4,1,6,10) | 1 | C(4,2,6,29) | 1 | C(4,3,6,13) |   |            |
| 2 | C(4,1,6,9)  | 2 | C(4,2,6,27) |   |             |   |            |
| 3 | C(4,1,6,11) | 3 | C(4,2,6,25) |   |             |   |            | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

42. The apparatus of claim 36, wherein the at least one antenna consists of four antennas and the downlink OL SU-MIMO codebook comprises a relation between a rank and a codebook subset size $N_w$ corresponding to the rank as in the following table:

|  | rank | |
| --- | --- | --- |
|  | 1 | 2 |
| $N_w$ | 2 | 1. |

43. The apparatus of claim 42, wherein when the two transmission antennas are used, the downlink OL SU-MIMO codebook comprises the following table:

| $C_{DLOLSU}(2,1,2,n)$ | | $C_{DLOLSU}(2,2,1,n)$ | |
| --- | --- | --- | --- |
| n | C(2,2,3,m) in base codebook | n | C(2,2,3,m) in base codebook |
| 0 | C(2,1,3,2) | 0 | C(2,2,3,2) |
| 1 | C(2,1,3,6) | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

44. The apparatus of claim 42, wherein when the two transmission antennas are used, the downlink OL SU-MIMO codebook comprises the following table:

| $C_{DLOLSU}(2,1,2,n)$ | | $C_{DLOLSU}(2,2,1,n)$ | |
| --- | --- | --- | --- |
| n | C(2,1,3,m) in base codebook | n | C(2,2,3,m) in base codebook |
| 0 | C(2,1,3,0) | 0 | C(2,2,3,0) |
| 1 | C(2,1,3,4) | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

45. The apparatus of claim 36, wherein the at least one antenna consists of four antennas and the downlink OL SU-MIMO codebook comprises a relation between a rank and a codebook subset size $N_w$ corresponding to the rank as in the following table:

|  | rank | |
| --- | --- | --- |
|  | 1 | 2 |
| $N_w$ | 4 | 2. |

46. The apparatus of claim 45, wherein when the two transmission antennas are used, the downlink OL SU-MIMO codebook comprises the following table:

| $C_{DLOLSU}(2,1,4,n)$ | | $C_{DLOLSU}(2,2,4,n)$ | |
| --- | --- | --- | --- |
| n | C(2,1,4,m) in base codebook | n | C(2,2,4,m) in base codebook |
| 0 | C(2,1,4,0) | 0 | C(2,2,4,0) |
| 1 | C(2,1,4,2) | 1 | C(2,2,4,2) |
| 2 | C(2,1,4,4) | | |
| 3 | C(2,1,4,6) | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

47. The apparatus of claim 36, wherein the at least one antenna consists of four antennas and the downlink OL SU-MIMO codebook comprises a relation between a rank and a codebook subset size $N_w$ corresponding to the rank in the following table:

|  | rank | | | |
| --- | --- | --- | --- | --- |
|  | 1 | 2 | 3 | 4 |
| $N_w$ | 4 | 2 | 2 | 1. |

48. The apparatus of claim 47, wherein when the four transmission antennas are used, the OL-MIMO codebook comprises the following table:

| $C_{DLOLSU}(4,1,4,n)$ | | $C_{DLOLSU}(4,2,2,n)$ | | $C_{DLOLSU}(4,3,2,n)$ | | $C_{DLOLSU}(4,4,1,n)$ | |
| --- | --- | --- | --- | --- | --- | --- | --- |
| n | C(4,1,6,m) in base codebook | n | C(4,2,6,m) in base codebook | n | C(4,3,6,m) in base codebook | n | C(4,4,6,m) in base codebook |
| 0 | C(4,1,6,8) | 0 | C(4,2,6,23) | 0 | C(4,3,6,12) | 0 | C(4,4,6,4) |
| 1 | C(4,1,6,10) | 1 | C(4,2,6,29) | 1 | C(4,3,6,13) | | |

-continued

| $C_{DLOLSU}(4,1,4,n)$ | $C_{DLOLSU}(4,2,2,n)$ | $C_{DLOLSU}(4,3,2,n)$ | $C_{DLOLSU}(4,4,1,n)$ |
|---|---|---|---|
| n | C(4,1,6,m) in base codebook | n | C(4,2,6,m) in base codebook | n | C(4,3,6,m) in base codebook | n | C(4,4,6,m) in base codebook |
| 2 C(4,1,6,9) | | | |
| 3 C(4,1,6,11) | | | | where $C_{DLOLSU}(N_t, M_t, N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t, M_t, N_w, i)$ is an i-th codebook entry of $C_{DLOLSU}(N_t, M_t, N_w)$.

49. The apparatus of claim 36, wherein the at least one antenna consists of four antennas and the downlink OL SU-MIMO codebook comprises a relation between a rank and a codebook subset size $N_w$ corresponding to the rank in the following table:

| | rank | | | |
|---|---|---|---|---|
| | 1 | 2 | 3 | 4 |
| $N_w$ | 4 | 4 | 4 | 4. |

50. The apparatus of claim 49, wherein when the four transmission antennas are used, the downlink OL SU-MIMO codebook comprises the following table:

| $C_{ULOLSU}(4,1,n)$ | | $C_{ULOLSU}(4,2,4,n)$ | | $C_{ULOLSU}(4,3,2,n)$ | | $C_{ULOLSU}(4,4,1,n)$ | |
|---|---|---|---|---|---|---|---|
| n | PMI m in UL base codebook of rank 1 | n | PMI m in UL base codebook of rank 2 | n | PMI m in UL base codebook of rank 3 | n | PMI m in UL base codebook of rank 3 |
| 0 | 9 | 0 | 9 | 0 | 9 | 0 | 9 |
| 1 | 15 | 1 | 15 | 1 | 15 | 1 | 15 |
| 2 | 49 | 2 | 49 | 2 | 49 | 2 | 49 |
| 3 | 55 | 3 | 55 | 3 | 55 | 3 | 55. |

51. The apparatus of claim 36, wherein the downlink OL SU-MIMO codebook has a nested property where a precoder of a lower rank comprises one of ordered and unordered columns of a precoder of a higher rank.

52. The apparatus of claim 36, wherein the codebook subset determining unit determines a codebook subset size for each rank;
determines a codebook subset that maximizes a minimum chordal distance with respect to all codewords of a relevant rank in the base codebook;
determines a codebook subset that maximizes a minimum product distance with respect to all the codewords of a corresponding rank in the base codebook; and
determines a codebook subset such that the corresponding rank is contained in a different rank in the codebook subset that meets the minimum chordal distance and the minimum product distance.

53. The apparatus of claim 52, wherein the minimum chordal distance is determined using the following equation:

$$OLcodebook\_candidates = \underset{1 \leq k < l \leq N}{\operatorname{argmax}\,\min} \sqrt{1 - |w_k^H w_l|^2}.$$

54. The apparatus of claim 52, wherein the minimum product distance is determined using the following equation:

$$OLcodebook = \underset{OLcodebook\_candidates}{\operatorname{argmax}} \underset{\theta_t}{\min} \prod_{k=1}^{N} |w_k^T a_t(\theta_t)|^2$$

$$a_t(\theta_t) = \begin{bmatrix} 1 & e^{-j2\pi \frac{d}{\lambda}\cos(\theta_t)} & \ldots & e^{-j2\pi(n_t-1)\frac{d}{\lambda}\cos(\theta_t)} \end{bmatrix}^T.$$

55. A receiving apparatus in a codebook-based Multiple Input Multiple Output (MIMO) system, the apparatus comprising:
a feedback transmitter for transmitting feedback information to a transmitter; and
wherein the feedback information is used for determining a downlink Open-Loop Single User MIMO (OL SU-MIMO) codebook subset within a base codebook,
an MIMO detector for receiving at least one data stream from the transmitter via at least one antenna using the determined downlink OL SU-MIMO codebook subset,
wherein the downlink OL SU-MIMO codebook subset comprises at least one codeword, a number of codewords determined based on a rank, and a number of transmission antennas.

56. The apparatus of claim 55, wherein the feedback information comprises at least one of a rank, a Channel Quality Indicator (CQI), and a subband index.

57. The apparatus of claim 55, wherein the at least one antenna consists of eight antennas and the downlink OL SU-MIMO codebook comprises a relation between a rank and a codebook subset size $N_w$ corresponding to the rank in the following table:

| | rank | | | | | | | |
|---|---|---|---|---|---|---|---|---|
| | 1 | 2 | 3 | 4 | 5 | 6 | 7 | 8 |
| $N_w$ | 8 | 4 | 4 | 2 | 2 | 2 | 2 | 1. |

58. The apparatus of claim 57, wherein when the eight transmission antennas are used, the downlink OL SU-MIMO codebook comprises the following table:

| $C_{DLOLSU}(8,1,8,n)$ | | $C_{DLOLSU}(8,2,4,n)$ | | $C_{DLOLSU}(8,3,4,n)$ | | $C_{DLOLSU}(8,4,2,n)$ | |
|---|---|---|---|---|---|---|---|
| n | C(8,1,4,m) in base codebook | n | C(8,2,4,m) in base codebook | n | C(8,3,4,m) in base codebook | n | C(8,4,4,m) in base codebook |
| 0 | C(8,1,4,0) | 0 | C(8,2,4,0) | 0 | C(8,3,4,0) | 0 | C(8,4,4,0) |
| 1 | C(8,1,4,3) | 1 | C(8,2,4,1) | 1 | C(8,3,4,1) | 1 | C(8,4,4,1) |
| 2 | C(8,1,4,5) | 2 | C(8,2,4,2) | 2 | C(8,3,4,2) | | |
| 3 | C(8,1,4,7) | 3 | C(8,2,4,3) | 3 | C(8,3,4,5) | | |
| 4 | C(8,1,4,9) | | | | | | |
| 5 | C(8,1,4,11) | | | | | | |
| 6 | C(8,1,4,13) | | | | | | |
| 7 | C(8,1,4,15) | | | | | | |

| $C_{DLOLSU}(8,5,2,n)$ | | $C_{DLOLSU}(8,6,2,n)$ | | $C_{DLOLSU}(8,7,2,n)$ | | $C_{DLOLSU}(8,8,1,n)$ | |
|---|---|---|---|---|---|---|---|
| n | C(8,5,4,m) in base codebook | n | C(8,6,4,m) in base codebook | n | C(8,7,4,m) in base codebook | n | C(8,8,4,m) in base codebook |
| 0 | C(8,5,4,0) | 0 | C(8,6,4,0) | 0 | C(8,7,4,0) | 0 | C(8,8,4,0) |
| 1 | C(8,5,4,1) | 1 | C(8,6,4,1) | 1 | C(8,7,4,1) | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

59. The apparatus of claim 55, wherein the at least one antenna consists of four antennas and the downlink OL SU-MIMO codebook comprises a relation between a rank and a codebook subset size $N_w$ corresponding to the rank in the following table:

| | rank | | | |
|---|---|---|---|---|
| | 1 | 2 | 3 | 4 |
| $N_w$ | 4 | 4 | 2 | 1. |

60. The apparatus of claim 59, wherein when the four transmission antennas are used, the downlink OL SU-MIMO codebook comprises the following table:

| $C_{DLOLSU}(4,1,4,n)$ | | $C_{DLOLSU}(4,2,4,n)$ | | $C_{DLOLSU}(4,3,2,n)$ | | $C_{DLOLSU}(4,4,1,n)$ | |
|---|---|---|---|---|---|---|---|
| n | C(4,1,6,m) in base codebook | n | C(4,2,6,m) in base codebook | n | C(4,3,6,m) in base codebook | n | C(4,4,6,m) in base codebook |
| 0 | C(4,1,6,8) | 0 | C(4,2,6,23) | 0 | C(4,3,6,12) | 0 | C(4,4,6,4) |
| 1 | C(4,1,6,10) | 1 | C(4,2,6,29) | 1 | C(4,3,6,13) | | |
| 2 | C(4,1,6,9) | 2 | C(4,2,6,27) | | | | |
| 3 | C(4,1,6,11) | 3 | C(4,2,6,25) | | | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

61. The apparatus of claim 55, wherein the at least one antenna consists of two antennas and the downlink OL SU-MIMO codebook comprises a relation between a rank and a codebook subset size $N_w$ corresponding to the rank in the following table:

| | rank | |
|---|---|---|
| | 1 | 2 |
| $N_w$ | 2 | 1. |

62. The apparatus of claim 61, wherein when the two transmission antennas are used, the downlink OL SU-MIMO codebook comprises the following table:

| $C_{DLOLSU}(2,1,2,n)$ | | $C_{DLOLSU}(2,2,1,n)$ | |
|---|---|---|---|
| n | C(2,1,3,m) in base codebook | n | C(2,2,3,m) in base codebook |
| 0 | C(2,1,3,2) | 0 | C(2,2,3,2) |
| 1 | C(2,1,3,6) | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

63. The apparatus of claim 61, wherein when the two transmission antennas are used, the downlink OL SU-MIMO codebook comprises the following table:

| $C_{DLOLSU}(2,1,2,n)$ | | $C_{DLOLSU}(2,2,1,n)$ | |
|---|---|---|---|
| n | C(2,1,3,m) in base codebook | n | C(2,2,3,m) in base codebook |
| 0 | C(2,1,3,0) | 0 | C(2,2,3,0) |
| 1 | C(2,1,3,4) | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

64. The apparatus of claim 55, wherein the at least one antenna consists of four antennas and the downlink OL SU-MIMO codebook comprises a relation between a rank and a codebook subset size $N_w$ corresponding to the rank in the following table:

| | rank | |
|---|---|---|
| | 1 | 2 |
| $N_w$ | 4 | 2. |

65. The apparatus of claim 64, wherein when the two transmission antennas are used, the downlink OL SU-MIMO codebook comprises the following table:

| $C_{DLOLSU}(2,1,4,n)$ | | $C_{DLOLSU}(2,2,2,n)$ | |
|---|---|---|---|
| n | C(2,1,4,m) in base codebook | n | C(2,2,4,m) in base codebook |
| 0 | C(2,1,4,0) | 0 | C(2,2,4,0) |
| 1 | C(2,1,4,2) | 1 | C(2,2,4,2) |
| 2 | C(2,1,4,4) | | |
| 3 | C(2,1,4,6) | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

66. The apparatus of claim 55, wherein the at least one antenna consists of four antennas and the downlink OL SU-MIMO codebook comprises a relation between a rank and a codebook subset size $N_w$ corresponding to the rank in the following table:

| | rank | | | |
|---|---|---|---|---|
| | 1 | 2 | 3 | 4 |
| $N_w$ | 4 | 2 | 2 | 1. |

67. The apparatus of claim 66, wherein when the four transmission antennas are used, the downlink OL SU-MIMO codebook comprises the following table:

| $C_{DLOLSU}(4,1,4,n)$ | | $C_{DLOLSU}(4,2,2,n)$ | | $C_{DLOLSU}(4,3,2,n)$ | | $C_{DLOLSU}(4,4,1,n)$ | |
|---|---|---|---|---|---|---|---|
| n | C(4,1,6,m) in base codebook | n | C(4,2,6,m) in base codebook | n | C(4,3,6,m) in base codebook | n | C(4,4,6,m) in base codebook |
| 0 | C(4,1,6,8) | 0 | C(4,2,6,23) | 0 | C(4,3,4,12) | 0 | C(4,4,3,4) |
| 1 | C(4,1,6,10) | 1 | C(4,2,6,29) | 1 | C(4,3,4,13) | | |
| 2 | C(4,1,6,9) | | | | | | |
| 3 | C(4,1,6,11) | | | | | | | where $C_{DLOLSU}(N_t,M_t,N_w)$ is a DownLink (DL) OL Single User-MIMO (SU-MIMO) index, $N_t$ is the number of transmission antennas, $M_t$ is the number of streams, $N_w$ is a codebook subset size of a given rank, and $C_{DLOLSU}(N_t,M_t,N_w,i)$ is an i-th codebook entry of $C_{DLOLSU}(N_t,M_t,N_w)$.

68. The apparatus of claim 55, wherein the at least one antenna consists of four antennas and the downlink OL SU-MIMO codebook comprises a relation between a rank and a codebook subset size $N_w$ corresponding to the rank in the following table:

| | rank | | | |
|---|---|---|---|---|
| | 1 | 2 | 3 | 4 |
| $N_w$ | 4 | 4 | 4 | 4. |

69. The apparatus of claim 68, wherein when the four transmission antennas are used, the downlink OL SU-MIMO codebook comprises the following table:

| $C_{IT,OLSI}(4,1,4,n)$ | | $C_{IT,OLSI}(4,2,4,n)$ | | $C_{IT,OLSI}(4,3,2,n)$ | | $C_{IT,OLSI}(4,4,1,n)$ | |
|---|---|---|---|---|---|---|---|
| n | PMI m in UL base codebook of rank 1 | n | PMI m in UL base codebook of rank 2 | n | PMI m in UL base codebook of rank 3 | n | PMI m in UL base codebook of rank 3 |
| 0 | 9 | 0 | 9 | 0 | 9 | 0 | 9 |
| 1 | 15 | 1 | 15 | 1 | 15 | 1 | 15 |
| 2 | 49 | 2 | 49 | 2 | 49 | 2 | 49 |
| 3 | 55 | 3 | 55 | 3 | 55 | 3 | 55. |

70. The apparatus of claim 55, wherein the downlink OL SU-MIMO codebook has a nested property where a precoder of a lower rank comprises one of ordered and unordered columns of a precoder of a higher rank.

* * * * *